(12) United States Patent
Tokumo et al.

(10) Patent No.: US 8,276,478 B2
(45) Date of Patent: *Oct. 2, 2012

(54) OPERATING PEDAL SUPPORT STRUCTURE

(75) Inventors: Masayuki Tokumo, Fuchu-cho (JP);
Toshihiro Matsuoka, Fuchu-cho (JP);
Keisuke Miyoshi, Fuchu-cho (JP)

(73) Assignee: Mazda Motor Corporation (JP)

( * ) Notice: Subject to any disclaimer, the term of this patent is extended or adjusted under 35 U.S.C. 154(b) by 1203 days.

This patent is subject to a terminal disclaimer.

(21) Appl. No.: 11/730,970

(22) Filed: Apr. 5, 2007

(65) Prior Publication Data

US 2007/0234841 A1    Oct. 11, 2007

(30) Foreign Application Priority Data

Apr. 11, 2006  (JP) ................................. 2006-108772
Jul. 7, 2006  (JP) ................................. 2006-188195

(51) Int. Cl.
*G05G 1/30* (2008.04)
(52) U.S. Cl. ........................................... 74/512; 74/560
(58) Field of Classification Search ............ 74/512–514, 74/560; B60T 7/06
See application file for complete search history.

(56) References Cited

U.S. PATENT DOCUMENTS

| 6,142,036 | A  | * | 11/2000 | Mizuma et al. | 74/512 |
| 6,176,340 | B1 | * | 1/2001 | Mizuma et al. | 180/274 |
| 7,665,565 | B2 | * | 2/2010 | Tokumo et al. | 180/274 |
| 7,775,555 | B2 | * | 8/2010 | Allen et al. | 280/748 |
| 7,987,743 | B2 | * | 8/2011 | Sukonthapanich | 74/512 |
| 2002/0189391 | A1 | * | 12/2002 | Matsumoto et al. | 74/512 |
| 2003/0056616 | A1 | * | 3/2003 | Matsumoto et al. | 74/512 |
| 2006/0162481 | A1 | * | 7/2006 | Sato | 74/512 |
| 2007/0137398 | A1 | * | 6/2007 | Tokumo et al. | 74/512 |
| 2011/0030500 | A1 | * | 2/2011 | Tokumo et al. | 74/512 |

FOREIGN PATENT DOCUMENTS

| EP | 0 659 615 A1 |   | 12/1994 |
| EP | 1323602 A1 | * | 7/2003 |
| EP | 1 557 330 A2 |   | 7/2005 |
| GB | 2353009 | * | 2/2001 |
| JP | 09-216528 |   | 8/1997 |
| JP | 2005-510785 |   | 4/2005 |
| WO | WO 03/045750 A1 |   | 6/2003 |

OTHER PUBLICATIONS

Chinese Office Action with mailing date of Jun. 11, 2010: Application No. 200710096883.0; with partial English translation.

* cited by examiner

*Primary Examiner* — Vinh T Luong
(74) *Attorney, Agent, or Firm* — Studebaker & Brackett PC; Donald R. Studebaker

(57) ABSTRACT

A pedal bracket (3) affixed to a dash panel (1) pivotably supports a pedal unit (2) via a first pivot shaft (13) and a pivotable lever (5) via a second pivot shaft (17). A shaft retainer (51) prevents a downward displacement of the first pivot shaft (17) under normal conditions, whereas the pivotable lever (5) goes into contact with a side member (33) of a vehicle body and pivots on the second pivot shaft (17) in a specific direction in the event of a vehicle collision, thereby thrusting and displacing the first pivot shaft (13) downward and disengaging the pedal unit (2) from the pedal bracket (3). At this time, the shaft retainer (51) draws back from underneath the first pivot shaft (13), for instance, as a result of pivoting of the pivotable lever (5) and goes into a nonrestrictive state in which the shaft retainer (51) allows a displacement of the first pivot shaft (13).

17 Claims, 26 Drawing Sheets

OPERATING PEDAL SUPPORT STRUCTURE

BACKGROUND OF THE INVENTION

1. Field of the Invention

The present invention relates to a support structure for an operating pedal of a vehicle.

2. Description of the Related Art

A conventionally known support structure for an operating pedal of a vehicle, such as a brake pedal or a clutch pedal, is such that a foot-operated pedal unit with a tread plate provided at a lower end is pivotably supported by a pedal bracket which is fixed to a dash panel, allowing a driver to pivot the operating pedal along a longitudinal direction of the vehicle. This structure permits the pedal unit which is supported by the pedal bracket at an upper end via a laterally extending first pivot shaft to pivot along the longitudinal direction of the vehicle when the driver presses down on the tread plate by the foot. In the design of this kind of operating pedal support structure, it is required that the pedal unit will not be greatly displaced rearward in the event of a collision (especially in a frontal collision) of the vehicle for protecting the driver's lower limbs.

An arrangement to meet the aforementioned requirement is described in Japanese Unexamined Patent Publication No. 2005-510785, for example. According to the Publication, a pedal bracket is pivotably supported by means of a laterally extending second pivot shaft and there is provided a pivotable lever which pivots on the second pivot shaft and goes into contact with a side member of a vehicle body in the event of a collision of the vehicle. In this arrangement, a first pivot shaft (pedal supporting shaft) is forcibly displaced rearward in the event of a collision and, as a consequence, a pedal unit and a tread plate are displaced in a frontward direction of the vehicle body.

Japanese Patent No. 3269372 shows another arrangement aimed at meeting the aforementioned requirement. According to the Patent, a support structure for an operating pedal is such that a pivot shaft of a pedal unit is displaced in a rearward direction of a vehicle relative to a tread plate provided at a lower end of the pedal unit in the event of the vehicle collision, the support structure including a spring which serves as biasing means for retaining the pivot shaft at an upper initial position.

On the other hand, European Patent Publication No. EP0659615 proposes a support structure for an operating pedal, in which arms of a pedal bracket holding a pivot shaft of a pedal unit deform and become separated form each other along a lateral direction of a vehicle body in the event of a vehicle collision so that the pedal unit is disengaged from the pedal bracket.

In the aforementioned arrangement of JP No. 2005-510785, the supporting shaft of the pedal unit is normally supported by the pivotable lever, so that an external force exerted on the pedal unit, for instance, tends to produce irregular movements of the pivotable lever, potentially causing the pedal unit to be supported in an unstable state and jeopardizing the driver's feeling of pedal operation.

In the aforementioned arrangement of JP No. 3269372, the pivot shaft pivotably supporting the pedal unit is likely to produce loose vibratory movements as a result of extension and compression of the spring. This makes it difficult to properly maintain comfortable operability of the pedal unit.

Also, the operating pedal support structure of EP0659615 has a problem that it is difficult to disengage the pedal unit from the pedal bracket in a reliable fashion if the pedal unit becomes aslant when the arms of the pedal bracket deform and become separated apart in the event of a vehicle collision.

In addition to solving the aforementioned problems of the prior art, it is required for an operating pedal support structure to prevent the pedal unit from becoming unexpectedly displaced downward to a great extent when a large downward external force is exerted on the pedal unit as a result of depression of the pedal by the driver.

SUMMARY OF THE INVENTION

In light of the aforementioned requirements and problems of the prior art, it is an object of the present invention to provide a support structure for an operating pedal which can prevent a rearward displacement of a tread plate of a pedal unit as well as an unexpected downward displacement of the pedal unit in the event of a collision of a vehicle, yet providing a comfortable feeling of pedal operation.

To accomplish the aforementioned object of the invention, a support structure for an operating pedal supported by a dash panel and operated to pivot back and forth along a longitudinal direction of a vehicle body includes a pedal bracket affixed to the dash panel, a pedal unit pivotably suspended by the pedal bracket via a first pivot shaft extending along a lateral direction of the vehicle body, a pivotable lever pivotably supported by the pedal bracket via a second pivot shaft extending along the lateral direction such that the pivotable lever goes into contact with a side member and pivots on the second pivot shaft in a specific direction in the event of a vehicle collision, thereby thrusting and displacing the first pivot shaft downward and thus releasing the pedal unit from the pedal bracket, and a shaft retainer which is in a restrictive state in which the shaft retainer keeps the first pivot shaft from coming off downward under normal conditions, and goes into a nonrestrictive state in which the shaft retainer allows a displacement of the first pivot shaft as a result of pivoting of the pivotable lever in the specific direction in the event of the vehicle collision.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
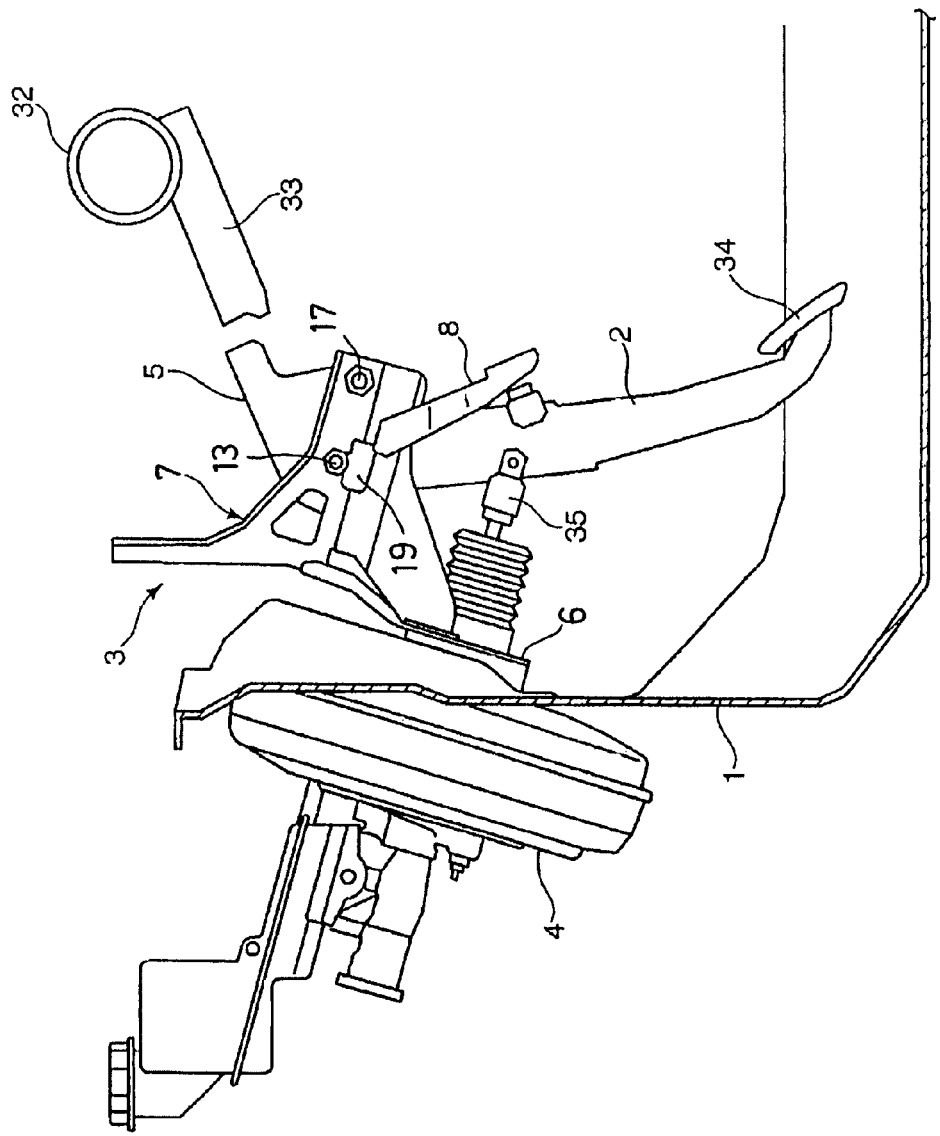
FIG. 1 is a partially sectional side view showing an overall construction of a support structure for an operating pedal according to a first embodiment of the invention.

FIG. 1 is a partially sectional side view of a support structure for an operating pedal of a vehicle according to a first embodiment of the invention, in which designated by the reference numeral 1 is a dash panel which separates the vehicle interior from an engine room, the operating pedal support structure including a pedal bracket 3 fixed to a rear side of the dash panel 1 with a brake booster 4 fixed to a front side of the dash panel 1, as well as a pedal unit 2 and a pivotable lever 5, both of which are mounted pivotably in a plane parallel to a longitudinal direction of the vehicle body. In the present and following embodiments, the operating pedal having the pedal unit 2 the pedal bracket 3 as principal elements described hereinafter, by way of example, is a foot-operated brake pedal for engaging brakes as illustrated.

Figure 2:
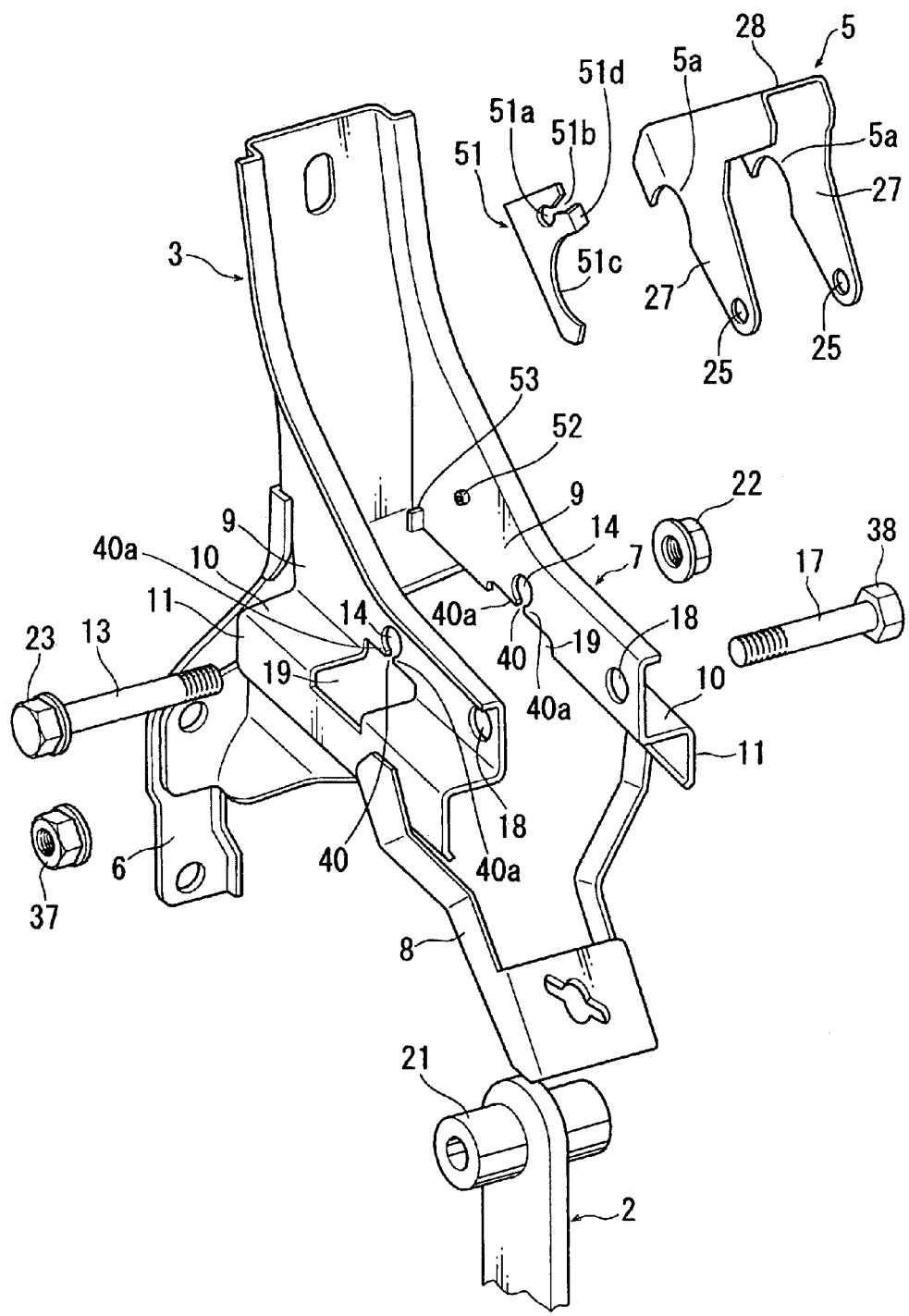
FIG. 2 is an exploded perspective view showing a specific example of the construction of the operating pedal support structure pedal according to the first embodiment.

As shown in FIG. 2, the pedal bracket 3 includes a mounting base plate 6 which is firmly bolted to the dash panel 1 and a bracket frame 7 having left and right bracket arms extending rearward from left and right end portions of the mounting base plate 6, respectively. The pedal bracket 3 is provided with a sensor mounting bracket 8 on which a sensor (not shown) for detecting depression of the pedal unit 2 is mounted, the sensor mounting bracket 8 projecting downward from rear end portions of the left and right bracket arms of the bracket frame 7. The bracket frame 7 includes left and right vertical plate portions 9 extending rearward from left and right ends of the mounting base plate 6, left and right horizontal plate portions 10 extending sideways from lower ends of the respective vertical plate portions 9 and left and right outside plate portions 11 extending downward from the respective horizontal plate portions 10. The bracket frame 7 thus structured provides excellent overall mechanical strength and stiffness.

Supporting holes 14 in which a first pivot shaft 13 constituting a pivotal axis of the pedal unit 2 is fitted are formed in the aforementioned left and right vertical plate portions 9 of the bracket frame 7. The first pivot shaft 13 is made of a bolt whose shank portion is passed through the supporting holes 14 formed in the left and right bracket arms of the bracket frame 7 and a shaft hole made through boss portions 21 of the pedal unit 2 formed in an upper end thereof. As a nut 22 is fitted on a far end of the first pivot shaft 13, a bolt head 23 of the first pivot shaft 13 and the nut 22 press against outer circumferential areas of the aforementioned left and right supporting holes 14 along a lateral direction of the vehicle body. With the first pivot shaft 13 fitted in the pedal bracket 3, passing through the left and right bracket arms of the bracket frame 7, the pedal unit 2 is suspended pivotably on the first pivot shaft 13.

Figure 4:
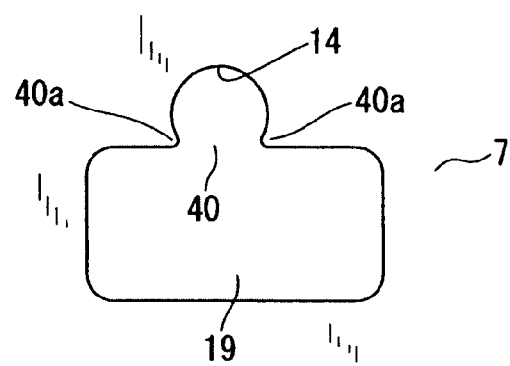
FIG. 4 is an enlarged fragmentary side view of a shaft hole for holding a first pivot shaft and a surrounding area thereof.
Figure 5:
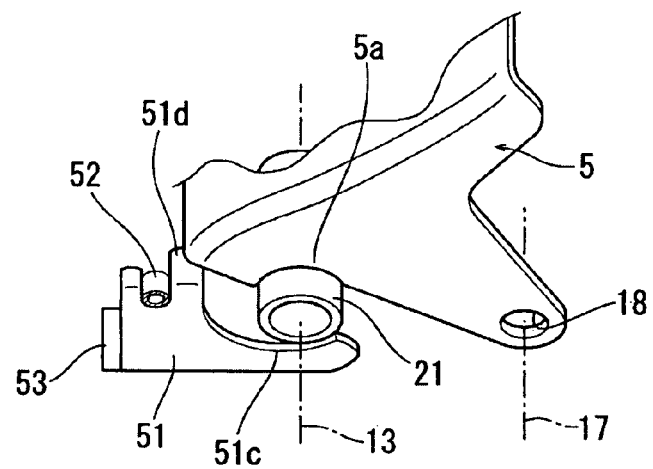
FIG. 5 is a fragmentary perspective view showing part of elements shown in FIG. 3.
Figure 6:
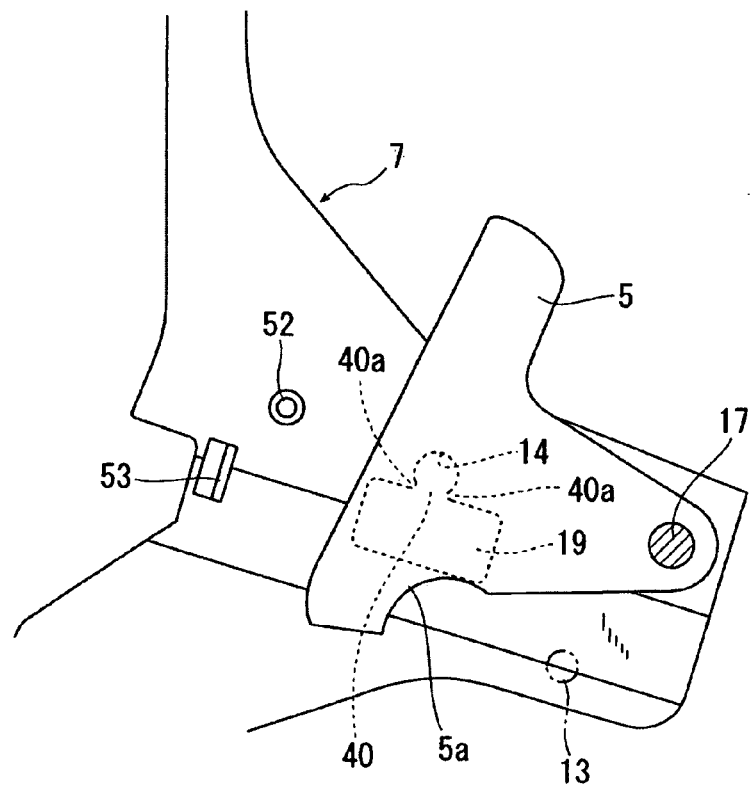
FIG. 6 is a side view of the principal portion of the operating pedal support structure corresponding to FIG. 3 showing especially a state after a vehicle collision.

In each bracket arm of the bracket frame 7 of the pedal bracket 3, there is formed an opening 19 having a large area encompassing the vertical plate portion 9, the horizontal plate portion 10 and the outside plate portion 11 immediately below the supporting hole 14 on each side. Furthermore, a narrower confinement channel 40 is formed in each bracket arm of the bracket frame 7. The confinement channel 40 extends continuously downward from the supporting hole 14 to the opening 19 as illustrated in FIG. 4, the confinement channel 40 having a width smaller than the diameter of the supporting hole 14, or the diameter of the first pivot shaft 13. A pair of front and rear projections 40a is formed in the vertical plate portion 9 of each bracket arm of the bracket frame 7, the front and rear projections 40a facing each other with the confinement channel 40 located in between. This pair of front and rear projections 40a (each of which corresponds to a retaining part mentioned in the appended claims) formed on an edge of each supporting hole 14 supports the first pivot shaft 13 fitted in the supporting hole 14 on each side of the bracket frame 7 from below, thus preventing the first pivot shaft 13 from coming off the supporting holes 14 and moving downward under normal conditions. The front and rear projections 40a on each side of the bracket frame 7 are caused to forcibly deform by the first pivot shaft 13 when a large downward thrust is exerted on the first pivot shaft 13 by the pivotable lever 5 in the event of a collision of the vehicle, thus allowing the first pivot shaft 13 to move downward into the openings 19 formed in the left and right bracket arms of the bracket frame 7 as will be later discussed. In FIG. 6 which shows a state of the operating pedal support structure after a vehicle collision, the front and rear projections 40a are depicted as if not deformed yet so that these projections 40a can be recognized clearly and easily.

The pivotable lever 5 includes left and right side plate portions 27 in which through holes 25 for passing a second pivot shaft 17 constituting a pivotal axis of the pivotable lever 5 are formed as well as a top plate portion 28 interconnecting upper ends of the left and right side plate portions 27. Supporting holes 18 in which the second pivot shaft 17 is fitted are formed in the vertical plate portions 9 of the left and right bracket arms of the bracket frame 7 at the rear of the aforementioned openings 19. The second pivot shaft 17 is made of a bolt whose shank portion is passed through the supporting holes 18 formed in the left and right bracket arms of the bracket frame 7 and the through holes 25 formed in the left and right side plate portions 27 of the pivotable lever 5. As a nut 37 is fitted on a far end of the second pivot shaft 17, a bolt head 38 of the second pivot shaft 17 and the nut 37 press against outer circumferential areas of the aforementioned left and right supporting holes 18 along the lateral direction of the vehicle body. With the second pivot shaft 17 fitted in the pedal bracket 3, passing through the pivotable lever 5, the pivotable lever 5 is supported pivotably on the second pivot shaft 17. It is to be noted that although the pivotable lever 5 is so supported as to receive a certain amount of frictional force exerted from surrounding elements (such as from inner faces of the vertical plate portions 9 of the left and right bracket arms of the bracket frame 7), the pivotable lever 5 is kept from freely pivoting with an ordinary level of external force which may act on the pivotable lever 5 under normal operating conditions. The pivotable lever 5 further includes a pair of thrusting parts 5a formed in part of each side plate portion 27 of the pivotable lever 5, this part being located above the first pivot shaft 13. Normally held in contact with the boss portions 21 of the pedal unit 2 through which the first pivot shaft 13 is fitted, the thrusting parts 5a of the left and right side plate portions 27 of the pivotable lever 5 thrust the first pivot shaft 13 downward in the event of a vehicle collision as will be later discussed.

In the vicinity of the first pivot shaft 13 and the boss portions 21 of the pedal unit 2, there is provided on each side of the pivotable lever 5 a shaft retainer 51 which normally remains hooked onto a short locking pin 52 provided on each bracket arm of the bracket frame 7. Specifically, the locking pin 52 sticking out inward from a specific part of the bracket arm of the bracket frame 7 at the front of the pivotable lever 5 (see FIG. 2) fits in a hooking hole 51a formed in an upper forward end part of the shaft retainer 51 without looseness, whereby the shaft retainer 51 is held in a specified position shown in FIG. 3, which is a side view of the pivotable lever 5, the shaft retainer 51 and associated elements as seen from a point between the vertical plate portions 9 of the left and right bracket arms of the bracket frame 7. For the sake of understanding, the boss portions 21 of the pedal unit 2 are shown by an alternate long and two short dashed line in FIG. 3 as well as in other drawings illustrating second to sixth embodiments of the invention.

There is formed an upward opening cutout 51b in the shaft retainer 51, the cutout 51b connecting to the aforementioned hooking hole 51a and gradually widening upward. If a large downward thrust is exerted on the shaft retainer 51 thus structured, the shaft retainer 51 is disengaged from the locking pin 52 and moves downward with the locking pin 52 passing through the cutout 51b.

Figure 3:
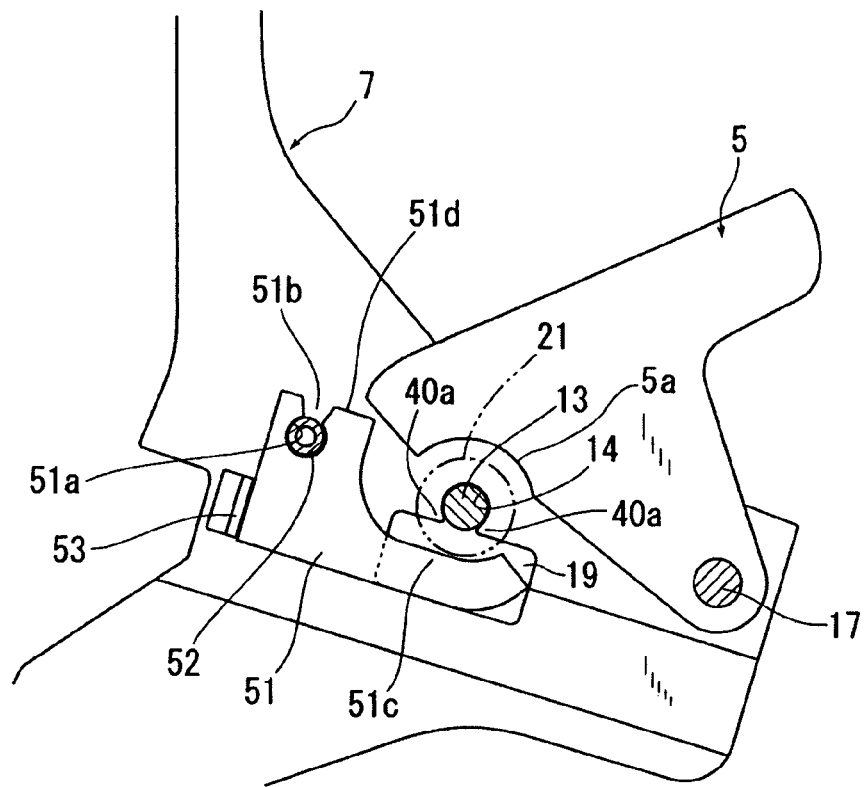
FIG. 3 is a side view of a principal portion of the operating pedal support structure of the first embodiment showing, in particular, a state under normal conditions.

The shaft retainer 51 has an elongate narrow-shaped lower part which extends obliquely downward beyond the first pivot shaft 13. A portion of the shaft retainer 51 located immediately below the first pivot shaft 13 under normal conditions constitutes a retaining part 51c which normally keeps the first pivot shaft 13 from coming off from its normal position. Shown in FIG. 3 is a restrictive state in which the first pivot shaft 13 is kept from coming off downward by the retaining part 51c of the shaft retainer 51. When the shaft retainer 51 comes off downward with the hooking hole 51a of the shaft retainer 51 disengaged from the locking pin 52 and the retaining part 51c set apart from the underside of the first pivot shaft 13, the shaft retainer 51 goes into a nonrestrictive state in which the shaft retainer 51 no longer keeps the first pivot shaft 13 from coming off downward.

Referring to FIGS. 2 and 3, located immediately at the front of the shaft retainer 51 in the restrictive state is a slightly projecting shaft retainer stopper 53 which is formed by cutting and bending small part of the vertical plate portion 9 of each bracket arm of the bracket frame 7 in a tablike form. The shaft retainer stopper 53 thus formed serves to restrict the shaft retainer 51 from turning further clockwise around the locking pin 52, thus shifting from the restrictive state shown in FIG. 3 to the aforementioned nonrestrictive state, under normal conditions.

More specifically, the retaining part 51c of the shaft retainer 51 is located below each boss portion 21 of the pedal unit 2 fitted on the first pivot shaft 13 immediately close thereto. (This arrangement applies not only to the first embodiment but also to the following embodiments.) The operating pedal support structure of the embodiment may be such that the retaining part 51c and the boss portions 21 are positioned in such a fashion that the retaining part 51c goes into contact with the boss portion 21 from underside under conditions where the first pivot shaft 13 is in a process of coming off the supporting holes 14 downward or when the first pivot shaft 13 just comes off the supporting holes 14.

The shaft retainer 51 further has a thrust-receiving part 51d which is shaped to receive the downward thrust exerted by the pivotable lever 5 in the event of a vehicle collision. While the operating pedal support structure is illustrated as if the pivotable lever 5 is associated with one only shaft retainer 51 in FIG. 2, the support structure of the present embodiment actually includes a pair of shaft retainers 51 disposed on both left and right sides of the pivotable lever 5. Needless to say, there may be provided one only shaft retainer 51 on the left or right side of the pivotable lever 5. (This arrangement applies not only to the first embodiment but also to the following embodiments.)

Referring to FIG. 1, there are provided a steering support 32 made of a structural member like a laterally extending pipe, for example, at the rear of the pivotable lever 5 and a side member 33 of the vehicle body fixed to the steering support 32, the side member 33 being made of a block member having high stiffness, for example. Under normal conditions, the side member 33 is located at a position separated rearward from a rear end of the pivotable lever 5 by a specific distance. When the dash panel 1 and the pedal bracket 3 shift rearward as a result of a vehicle collision (frontal collision), the rear end of the pivotable lever 5 attached to the pedal bracket 3 goes into contact with the side member 33. Since the side member 33 affixed to the steering support 32 scarcely shifts rearward due to the collision, the side member 33 exerts a large frontward sustaining force (external force) on the pivotable lever 5. When acted upon by this large frontward external force, the pivotable lever 5 pivots on the second pivot shaft 17 overwhelming the frictional force exerted from the surrounding elements. Specifically, the pivotable lever 5 pivots on the second pivot shaft 17 in such a way that the rear end of the pivotable lever 5 (that is, a contact part which goes into contact with the side member 33) is displaced frontward, or in a counterclockwise direction as illustrated in FIGS. 1 and 3.

The pedal unit 2 is provided with a tread plate 34 at a lower end as shown in FIG. 1. According to the above-described operating pedal support structure of the embodiment, the pedal unit 2 pivots frontward on the first pivot shaft 13, thereby exerting a frontward force on the brake booster 4 through a push rod 35 attached to the pedal unit 2, when a driver presses down on the tread plate 34 of the pedal unit 2 by the foot under normal conditions in which the first pivot shaft 13 is positioned in the left and right supporting holes 14 as shown in FIGS. 1 and 3. Then, when the driver releases the tread plate 34 of the pedal unit 2, the pedal unit 2 biased rearward by a return spring (not shown) pivots back to a home position. Since the first pivot shaft 13 is supported directly by the supporting holes 14 formed in the left and right bracket arms of the bracket frame 7 and kept from coming off the supporting holes 14 by the pair of front and rear projections 40a formed on each bracket arm of the bracket frame 7, the pedal unit 2 produces smooth pivoting motion along the longitudinal direction of the vehicle during the aforementioned braking and brake-releasing operation under normal conditions, making it possible to provide comfortable operability of the pedal unit 2.

In addition, even when the driver depresses the pedal unit 2 downward by stamping on the tread plate 34 so that the boss portions 21 of the pedal unit 2 exert a large downward external force against the projections 40a formed on the left and right bracket arms of the bracket frame 7, the aforementioned structure of the embodiment prevents the first pivot shaft 13 from coming off the supporting holes 14 thereof, thus allowing the pedal unit 2 to smoothly pivot on the first pivot shaft 13 according to the driver's pedal operation in a reliable fashion.

Figure 7:
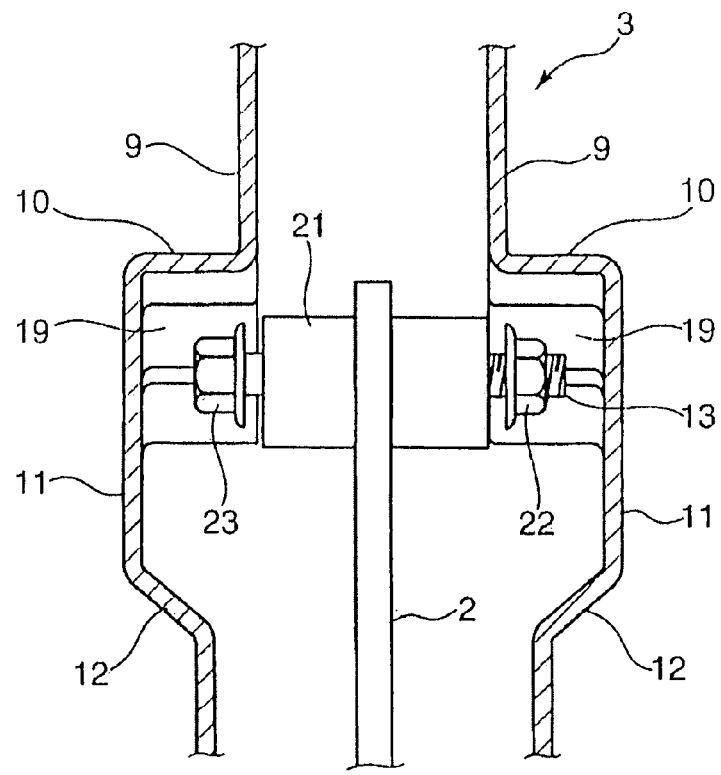
FIG. 7 is a frontal cross-sectional view of a pedal unit which has been disengaged from a pedal bracket as a result of the vehicle collision.

In the event of a vehicle collision, on the other hand, the pivotable lever 5 is displaced rearward together with the dash panel 1 and the left and right bracket arms of the bracket frame 7, so that the rear end of the pivotable lever 5 eventually goes into contact with the side member 33. If the bracket frame 7 is forced to move rearward even after the pivotable lever 5 has gone into with the side member 33, the side member 33 exerts a large frontward sustaining force (external force) on the pivotable lever 5, thereby causing the pivotable lever 5 to pivot counterclockwise as illustrated in FIGS. 1 and 3. Due to this counterclockwise, or frontward, pivoting of the pivotable lever 5, the thrust-receiving part 51d of each shaft retainer 51 is forced downward and, as a consequence, the shaft retainers 51 is forcibly released from the locking pin 52 formed on each bracket arm of the bracket frame 7 and the shaft retainers 51 come off the respective bracket arms of the bracket frame 7. If the pivotable lever 5 further pivots frontward even after each shaft retainer 51 has come off the corresponding bracket arm of the bracket frame 7, the thrusting parts 5a of the pivotable lever 5 press the boss portions 21 of the pedal unit 2 with a large downward thrusting force. The first pivot shaft 13 acted upon by the large downward thrusting force in this way comes off the supporting holes 14 into the openings 19 in the left and right bracket arms of the bracket frame 7 while plastically deforming the pair of projections 40a formed on the bracket arms of the bracket frame 7 in such a way that the confinement channel 40 below each supporting hole 14 spreads out. FIGS. 6 and 7 show a state in which the first pivot shaft 13 has come off both supporting holes 14 in the above-described manner as a result of the vehicle collision.

When the first pivot shaft 13 comes off the supporting holes 14 into the openings 19 in the left and right bracket arms of the bracket frame 7 through the respective confinement channels 40 and is thereby disengaged from the bracket frame 7 of the pedal bracket 3 (or freed from the bracket frame 7) as described above, it becomes possible for an upper end of the pedal unit 2 to move rearward to a large extent and for the tread plate 34 to move correspondingly frontward. Under conditions where the tread plate 34 is allowed to move frontward as described above, the operating pedal support structure is kept from exerting a large rearward load, or stress, on the driver whose one foot is placed on the tread plate 34 of the pedal unit 2, thereby protecting the driver's lower limb in an effective fashion. Additionally, since the first pivot shaft 13 is forcibly released from the bracket frame 7 with the aid of the pivotable lever 5 which is caused to pivot by the sustaining force of the side member 33, the driver is protected in a reliable fashion.

Second Embodiment

Figure 8:
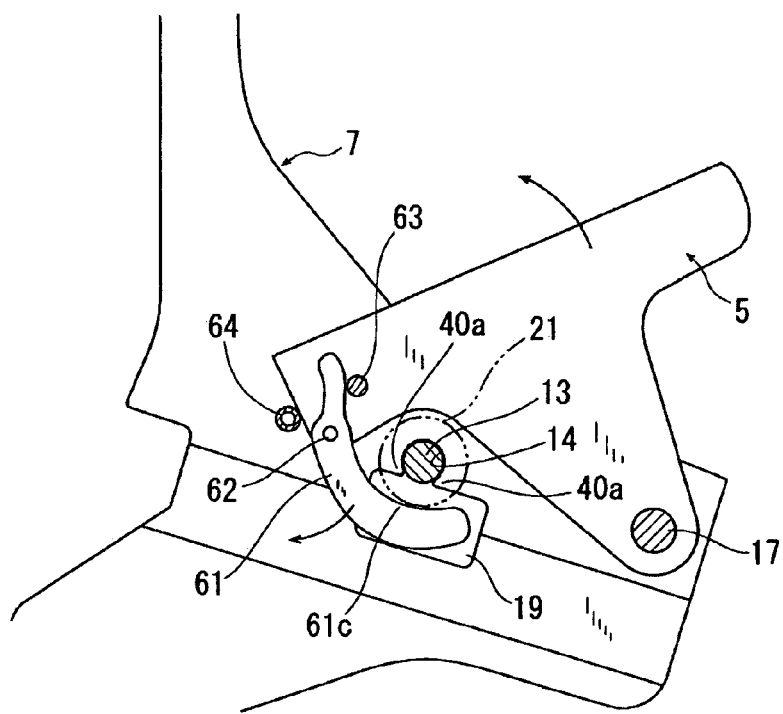
FIG. 8 is a side view of a principal portion of a support structure for an operating pedal showing, in particular, a state under normal conditions according to a second embodiment of the invention.
Figure 9:
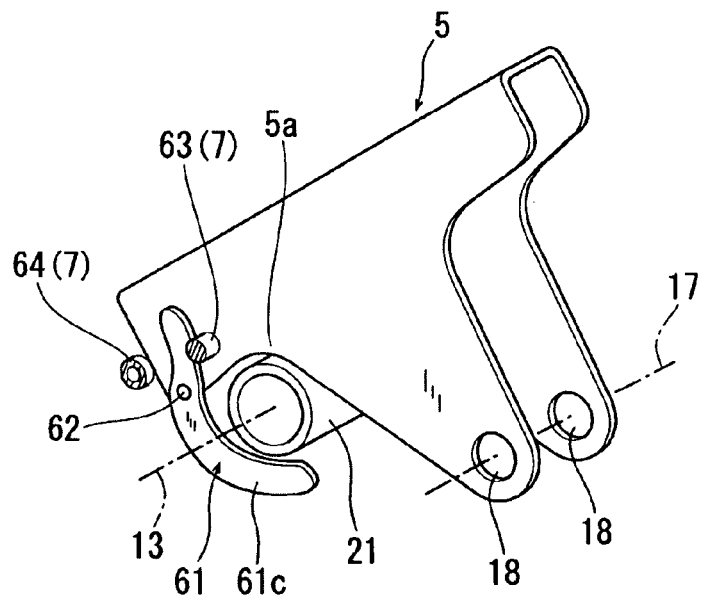
FIG. 9 is a perspective view showing part of elements shown in FIG. 8.

FIGS. 8 and 9 are diagrams showing an operating pedal support structure according to a second embodiment of the invention, in which elements like those of the first embodiment are designated by the same symbols and a detailed description of such elements are not given below again.

In this embodiment, the shaft retainers 51 of the first embodiment are replaced by shaft retainers 61. These shaft retainers 61 are elongate, leverlike narrow members attached to the pivotable lever 5 pivotably on short supporting pins 62 which protrude laterally outward from outside surfaces of the pivotable lever 5 close to a forward end thereof. Under normal conditions, each shaft retainer 61 is held stationary in a position shown in FIG. 8 without pivoting unless a relatively large force is applied (as in the following embodiments employing supporting pins of a like structure).

The shaft retainers 61 held by the pivotable lever 5 pivotably thereon each have a retaining part 61c (which corresponds to the retaining part 51c of the foregoing first embodiment) which is located immediately below the one of the boss portions 21 of the first pivot shaft 13 under normal conditions. On an inside surface of each bracket arm of the bracket frame 7, there is provided an inward projecting stopper pin 63 immediately to the rear of an upper end portion of the shaft retainer 61 to restrict pivoting motion of the shaft retainer 61 so that the shaft retainers 61 do not turn clockwise beyond a position shown in FIG. 8, or so that the shaft retainers 61 do not go from a restrictive state to a nonrestrictive state, under normal conditions. Even when a downward force is exerted from the first pivot shaft 13 onto the shaft retainers 61 in the restrictive state, the stopper pins 63 receive the downward force according to the aforementioned arrangement. Thus, the operating pedal support structure of the present embodiment can support the pivotable lever 5 in a reliable fashion by preventing the pivotable lever 5 from being acted upon by a large pivoting force under normal conditions.

In addition, there is provided a short inward projecting stopper pin 64 on the inside surface of each bracket arm of the bracket frame 7, the stopper pin 64 being located opposite to the stopper pin 63 with respect to the upper end portion of the shaft retainer 61. When the pivotable lever 5 pivots frontward (i.e., counterclockwise around the second pivot shaft 17 as illustrated in FIG. 8) in the event of a vehicle collision, the supporting pin 62 of the shaft retainer 61 shown in FIG. 8 also pivots counterclockwise around the second pivot shaft 17. As a consequence, the upper end portion of the shaft retainer 61 on each side of the pivotable lever 5 goes into contact with the stopper pin 64. The left and right shaft retainers 61 pivot counterclockwise and go from the restrictive state to the nonrestrictive state in the above-described manner in the event of a vehicle collision.

Each of the aforementioned stopper pins 63 and 64 can be made by cutting and raising part of the vertical plate portion 9 of the corresponding bracket arm of the bracket frame 7 or by projectingly fixing a pin member thereto (as in the following embodiments employing similar projecting parts).

Third Embodiment

Figure 10:
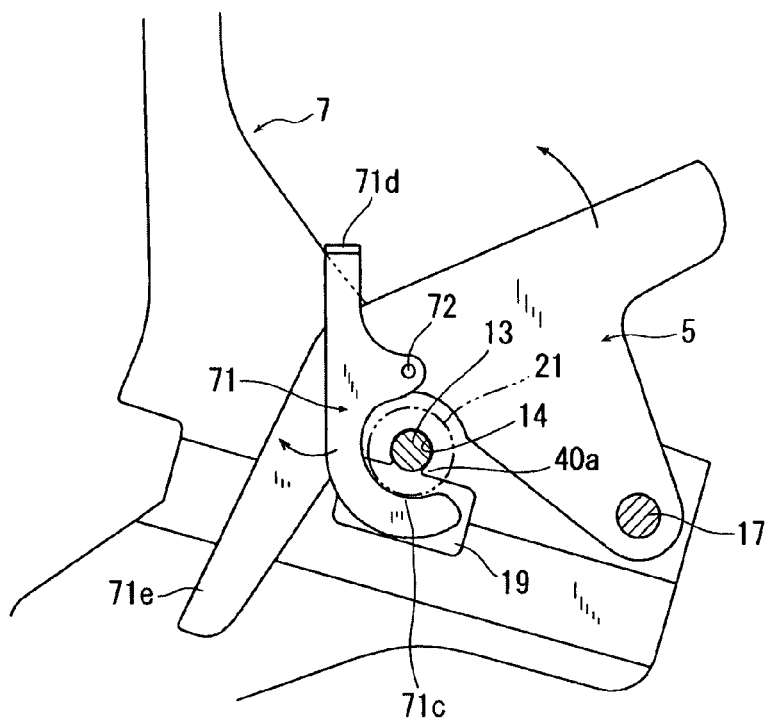
FIG. 10 is a side view showing a principal portion of a support structure for an operating pedal showing, in particular, a state under normal conditions according to a third embodiment of the invention.
Figure 11:
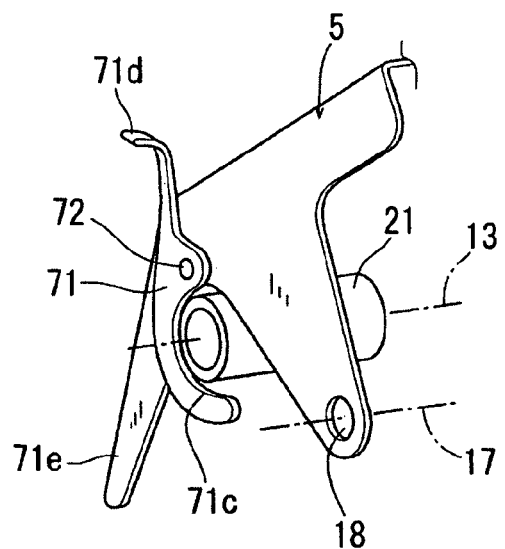
FIG. 11 is a fragmentary perspective view of part of elements shown in FIG. 10.

FIGS. 10 and 11 are diagrams showing an operating pedal support structure according to a third embodiment of the invention, in which elements like those of the foregoing embodiments are designated by the same symbols and a detailed description of such elements are not given below again.

The third embodiment is similar to the second embodiment in that shaft retainers 71 (which correspond to the shaft retainers 51, 61 of the first and second embodiments) are fixed to the pivotable lever 5 by respective supporting pins 72 which protrude laterally outward from the pivotable lever 5. The shaft retainers 71 each have a retaining part 71c which is located immediately below one of the boss portions 21 of the first pivot shaft 13 under normal conditions, but there is not provided any projecting part corresponding to the stopper pin 63 of the second embodiment on either bracket arm of the bracket frame 7 of the pedal bracket 3. In the operating pedal support structure of this embodiment, each of the supporting pins 72 is located at a position above the boss portion 21 of the first pivot shaft 13 on or near a straight line drawn from a point where the retaining part 71c of the shaft retainer 71 supports the boss portion 21 through a central axis of the first pivot shaft 13, so that a large moment of pivotal force around the supporting pin 72 does not act on the shaft retainer 71 even when a downward thrust acts on the retaining part 71c under normal conditions shown in FIG. 10. Thus, in this embodiment, the shaft retainers 71 are kept in a restrictive state in a reliable fashion even without the provision of the stopper pins 63 shown in the second embodiment.

A short upper end portion of each shaft retainer 71 is laterally bent to form a hooking part 71d as illustrated. The hooking part 71d of the shaft retainer 71 on each side of the pivotable lever 5 becomes engaged with (or goes into contact with) the bracket arm of the bracket frame 7 of the pedal bracket 3 in the event of a vehicle collision, whereby the shaft retainer 71 is brought from the restrictive state to a nonrestrictive state. Specifically, as the pivotable lever 5 pivots on the second pivot shaft 17 in the counterclockwise direction as illustrated in FIG. 10, producing a frontward motion, as a result of a vehicle collision, the left and right supporting pins 72 of the pivotable lever 5 also turn around the second pivot shaft 17 in a pivoting motion (counterclockwise as illustrated in FIG. 10), causing the hooking part 71d of each shaft retainer 71 to engage with the bracket frame 7. As the pivotable lever 5 pivots further counterclockwise as illustrated in FIG. 10 and the supporting pins 72 move frontward, the hooking part 71d of each shaft retainer 71 whose counterclockwise pivoting motion is limited by engagement with the bracket frame 7 pivots in a clockwise direction as illustrated in FIG. 10 (i.e., in a direction opposite to the pivoting motion of the pivotable lever 5), whereby each shaft retainer 71 shifts to the nonrestrictive state. Then, as the pivotable lever 5 further privets counterclockwise as illustrated in FIG. 10 after the left and right shaft retainers 71 have gone into the nonrestrictive state, the first pivot shaft 13 is thrust downward and released from the supporting holes 14.

In this embodiment, the pivotable lever 5 has an elongated thrusting part 71e extending obliquely downward from the forward end of the pivotable lever 5. The 71e serves to push the upper end of the pedal unit 2 rearward after the first pivot shaft 13 has come off the supporting holes 14 as a result of the aforementioned frontward pivoting of the pivotable lever 5. In the operating pedal support structure of the third embodiment in which the upper end of the pedal unit 2 is forced rearward as mentioned above, it is possible to forcibly displace the tread plate 34 of the pedal unit 2 frontward. This feature of the embodiment makes it possible to alleviate a load (stress) applied to the driver's lower limb in the event of a vehicle collision in a reliable fashion. It will be recognized that the aforementioned type of elongated thrusting part 71e can also be formed on the pivotable lever 5 of the foregoing embodiments.

Fourth Embodiment

Figure 12:
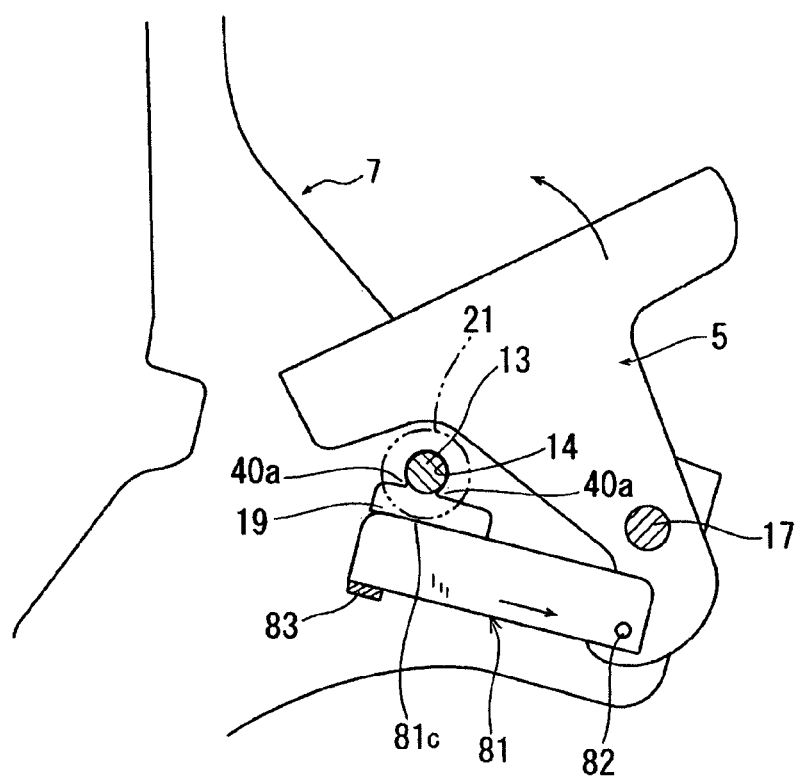
FIG. 12 is a side view of a principal portion of a support structure for an operating pedal showing, in particular, a state under normal conditions according to a fourth embodiment of the invention.

FIG. 12 is a side view showing an operating pedal support structure according to a fourth embodiment of the invention, in which elements like those of the foregoing embodiments are designated by the same symbols and a detailed description of such elements are not given below again.

The operating pedal support structure of this embodiment is provided with left and right shaft retainers 81 (which correspond to the shaft retainers 51, 61, etc. of the foregoing embodiments), each shaft retainer 81 having a rodlike structure extending generally along the longitudinal direction of the vehicle with a retaining part 81c located immediately below one of the boss portions 21 of the first pivot shaft 13 formed atop each shaft retainer 81 under normal conditions. With a rear end of each shaft retainer 81 joined to a lower rear portion of the pivotable lever 5 by means of a joint pin 82, each shaft retainer 81 is supported slidably along the longitudinal direction of the vehicle by a stopper 83 projecting from the bracket arm of the bracket frame 7 on each side so that a pair of stoppers 83 normally prevents the left and right shaft retainers 81 from being displaced downward. Shown in FIG. 12 is a restrictive state of the shaft retainers 81 under normal conditions. In the event of a vehicle collision, the shaft retainers 82 are displaced rearward as a result of a frontward pivoting motion of the pivotable lever 5, so that the left and right shaft retainers 81 are also displaced rearward and thereby brought into a nonrestrictive state. The first pivot shaft 13 is forced downward by the pivotable lever 5 after the shaft retainers 81 have gone into the nonrestrictive state in the aforementioned manner.

Fifth Embodiment

Figure 13:
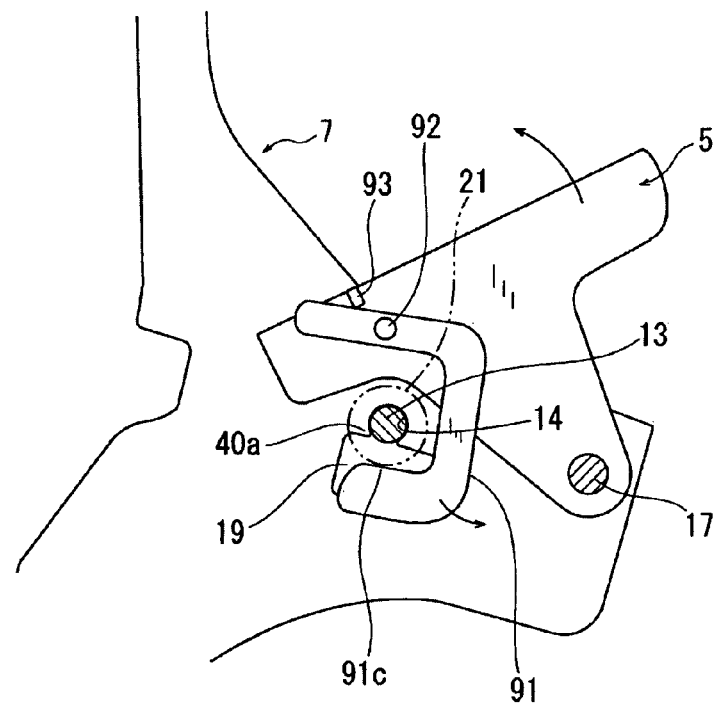
FIG. 13 is a side view of a principal portion of a support structure for an operating pedal showing, in particular, a state under normal conditions according to a fifth embodiment of the invention.

FIG. 13 is a side view showing an operating pedal support structure according to a fifth embodiment of the invention, in which elements like those of the foregoing embodiments are designated by the same symbols and a detailed description of such elements are not given below again.

In this embodiment, the operating pedal support structure is provided with left and right shaft retainers 91 (which correspond to the shaft retainers 51, 61, etc. of the foregoing embodiments), each of the shaft retainers 91 having a generally U-shaped structure and attached pivotably with respect to the pivotable lever 5 by means of a supporting pin 92 on each side. Designated by the symbol 91c in FIG. 13 is a retaining part of the shaft retainer 91 on one side of the pivotable lever 5, the retaining part 91c being located immediately below one of the boss portions 21 of the first pivot shaft 13 under normal conditions. As in the third embodiment shown in FIGS. 10 and 11, there is not provided any stopper member (like the stopper 83 of the fourth embodiment) for keeping each shaft retainer 91 in a restrictive state depicted in FIG. 13 under normal conditions. In the operating pedal support structure of this embodiment, each of the supporting pins 92 is located at a position above the boss portion 21 of the first pivot shaft 13 on or near a straight line drawn from a point where the retaining part 91c of the shaft retainer 91 supports the boss portion 21 through a central axis of the first pivot shaft 13, so that a large moment of pivotal force around the supporting pin 92 does not act on the shaft retainer 91 even when a downward thrust acts on the retaining part 91c under normal conditions shown in FIG. 13. Thus, in this embodiment, the shaft retainers 91 are kept in the restrictive state in a reliable fashion even without the provision of the aforementioned stopper member.

In this embodiment, the pivotable lever 5 has a thrusting part 93 formed on each side (left and right) for bringing the shaft retainer 91 from the restrictive state to a nonrestrictive state by pushing one end portion of the shaft retainer 91 in the event of a vehicle collision. Specifically, as the pivotable lever 5 privets on the second pivot shaft 17 in the counterclockwise direction as illustrated in FIG. 13, producing a frontward motion, as a result of a vehicle collision, the thrusting part 93 on each side of the pivotable lever 5 pushes the aforementioned one end portion of the shaft retainer 91, causing the shaft retainer 91 to pivot counterclockwise on the supporting pin 92 (as illustrated in FIG. 13) and go from the restrictive state to the nonrestrictive state. The first pivot shaft 13 is forced downward by the pivotable lever 5 after the shaft retainers 91 have gone into the nonrestrictive state in the aforementioned manner.

Sixth Embodiment

Figure 14:
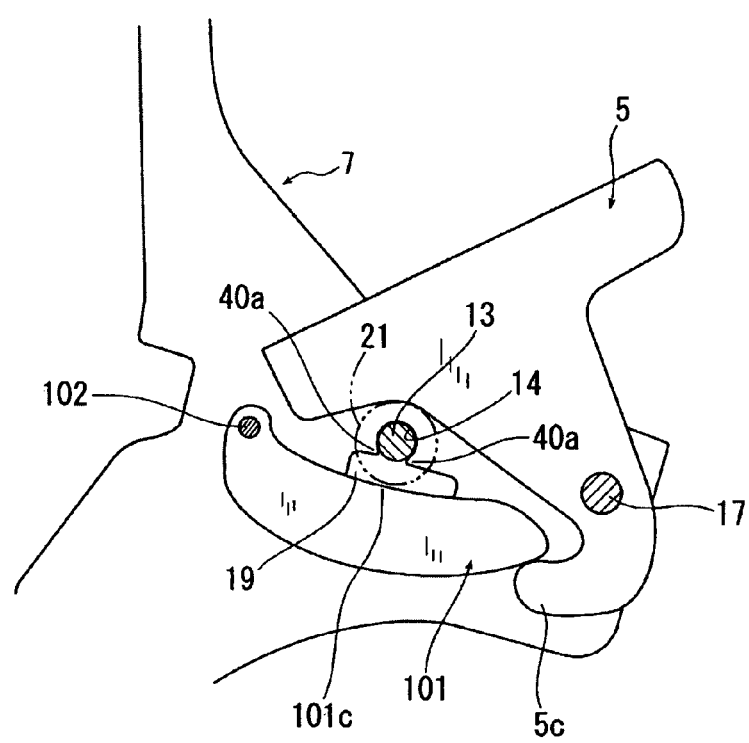
FIG. 14 is a side view of a principal portion of a support structure for an operating pedal showing, in particular, a state under normal conditions according to a sixth embodiment of the invention.

FIG. 14 is a side view showing an operating pedal support structure according to a sixth embodiment of the invention, in which elements like those of the foregoing embodiments are designated by the same symbols and a detailed description of such elements are not given below again.

The operating pedal support structure of this embodiment is provided with left and right shaft retainers 101 (which correspond to the shaft retainers 51, 61, etc. of the foregoing embodiments), each shaft retainer 101 having a narrow structure extending generally along the longitudinal direction of the vehicle with a retaining part 101c located immediately below one of the boss portions 21 of the first pivot shaft 13 formed atop each shaft retainer 101 under normal conditions.

A forward end of each shaft retainer 101 is joined to one of the bracket arms of the bracket frame 7 of the pedal bracket 3 pivotably thereon by means of a joint pin 102 which is located at the front of the first pivot shaft 13. A lower rear portion of the pivotable lever 5 is shaped to form a forward projecting part 5c which is curved in the form of a hook to support a rear end of each shaft retainer 101 atop. The forward end of each shaft retainer 101 is held affixed to one of the bracket arms of the bracket frame 7 and the rear end of each shaft retainer 101 is held by one of the projecting parts 5c of the pivotable lever 5 as described above. This structure of the embodiment make it possible to maintain the left and right shaft retainers 101 in a restrictive state in which the first pivot shaft 13 is kept from coming off the supporting holes 14 thereof downward under normal conditions.

In the event of a vehicle collision, on the other hand, the pivotable lever 5 pivots on the second pivot shaft 17 in the counterclockwise direction as illustrated in FIG. 14, so that the operating pedal support structure is released from the restrictive state in which the rear end of each shaft retainer 101 is supported by the projecting part 5c of the pivotable lever 5. As a result, both the left and right shaft retainers 101 pivot on the respective supporting pins 102 due to own weights in the counterclockwise direction as illustrated in FIG. 14, whereby the operating pedal support structure goes into a nonrestrictive state in which the shaft retainers 101 no longer keep the first pivot shaft 13 in position. The first pivot shaft 13 is forced downward by the pivotable lever 5 after the shaft retainers 101 have gone into the nonrestrictive state in the aforementioned manner.

While the invention has been described with reference to the operating pedal support structures in which the pivotable lever 5 is normally held in a fixed position due to the frictional force exerted from the surrounding elements in the foregoing first to sixth embodiments, a mechanism for keeping the pivotable lever 5 in position is not limited to such a structure. For example, there may be provided a separate stopper mechanism for keeping the pivotable lever 5 from pivoting under normal conditions. This varied structure also keeps the first pivot shaft 13 in the supporting holes 14 in a reliable fashion as the structure can reliably prevent the pivotable lever 5 from pivoting counterclockwise (as illustrated in FIGS. 3, 8-14) and thrusting the first pivot shaft 13 downward out of the supporting holes 14 under normal conditions. The aforementioned stopper mechanism can be made of a locking projection formed on one of the side plate portions 27 of the pivotable lever 5 and a locking hole formed in a facing side wall of the corresponding bracket arm of the bracket frame 7, for example. Conversely, the stopper mechanism may be made of a locking projection formed on a side wall of at least one bracket arm of the bracket frame 7 and a locking hole formed in the facing side plate portion 27 of the pivotable lever 5. If the locking projection of this kind of stopper mechanism, if employed, is limited to a certain level, the locking projection will easily deform, allowing the pivotable lever 5 to pivot and force the first pivot shaft 13 downward out of the supporting holes 14 in a reliable fashion in the event of a vehicle collision. The locking projection of the aforementioned stopper mechanism can be made by cutting and raising part of one side plate portion 27 of the pivotable lever 5 or attaching a projecting pin thereto, for example.

Seventh Embodiment

Figure 15:
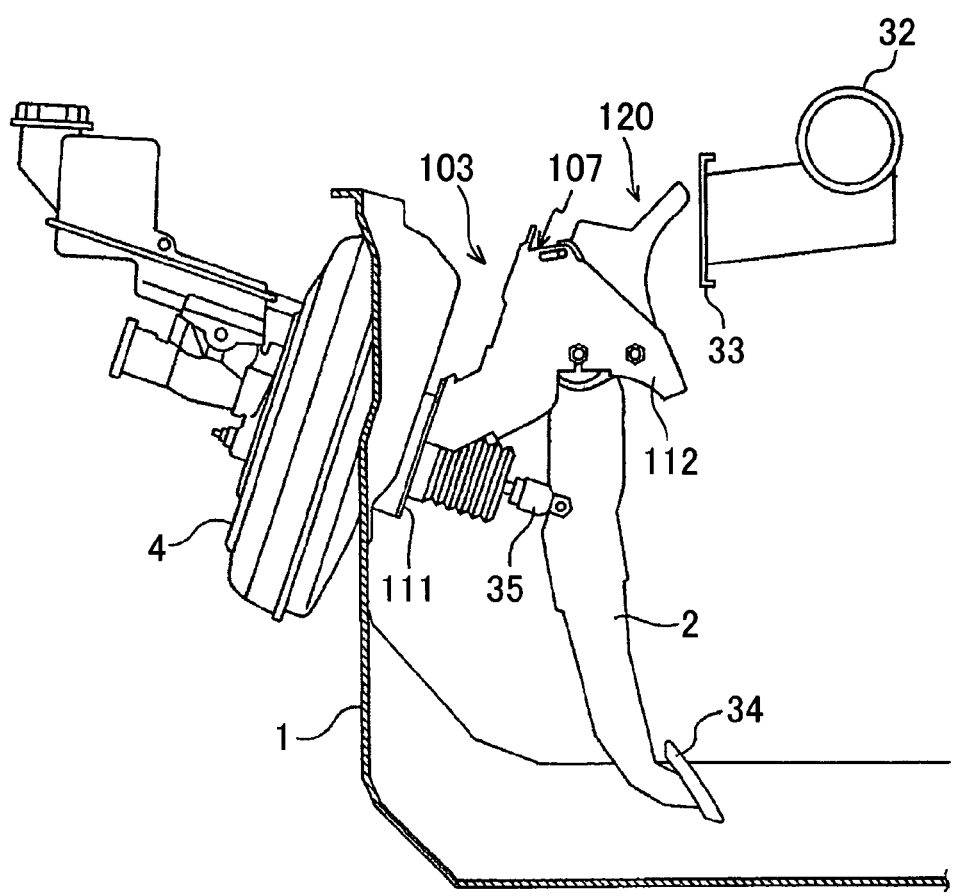
FIG. 15 is a partially sectional side view showing an overall construction of a support structure for an operating pedal according to a seventh embodiment of the invention.
Figure 16:
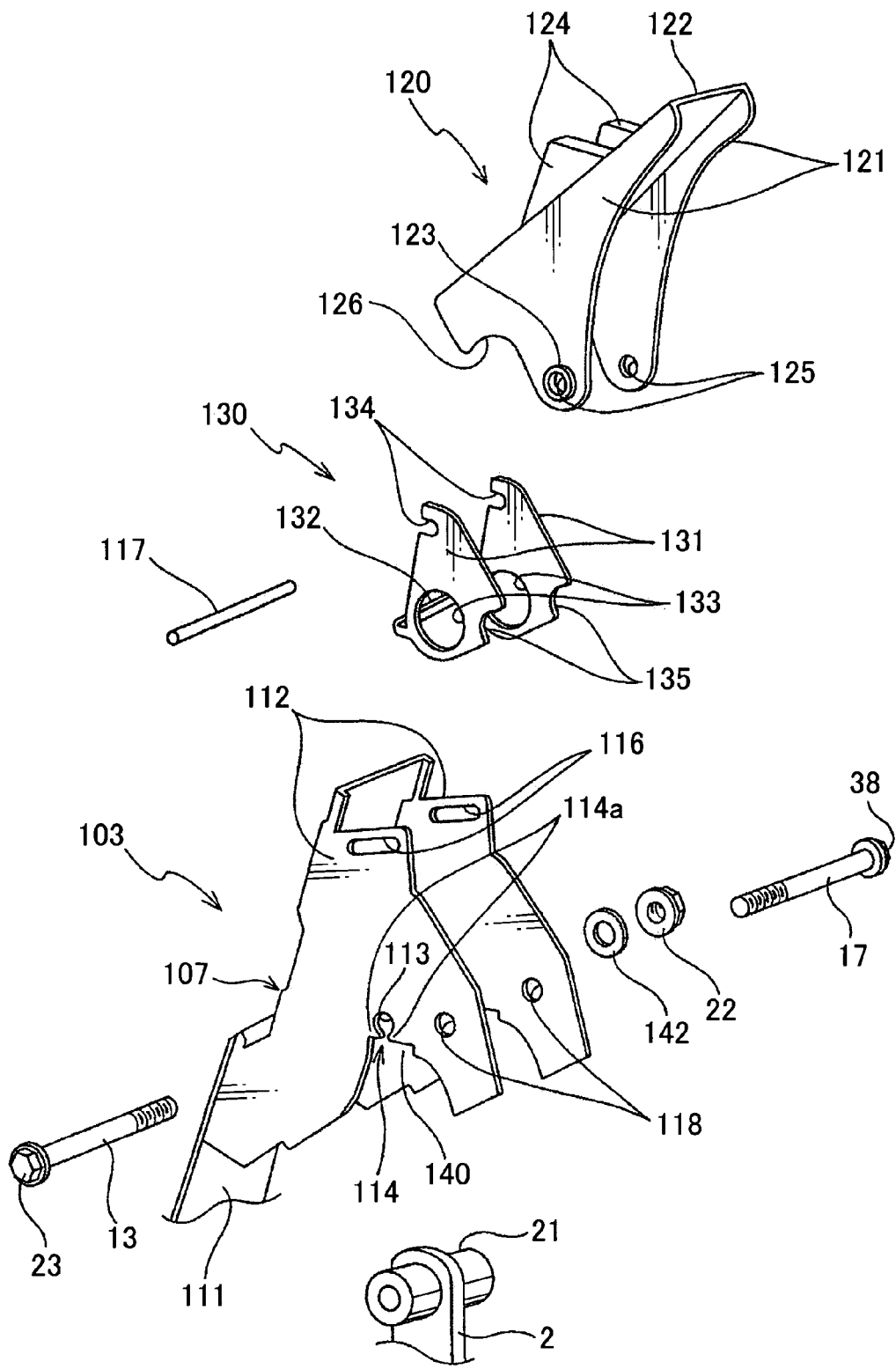
FIG. 16 is an exploded perspective view showing a specific example of the construction of the operating pedal support structure according to the seventh embodiment.
Figure 17:
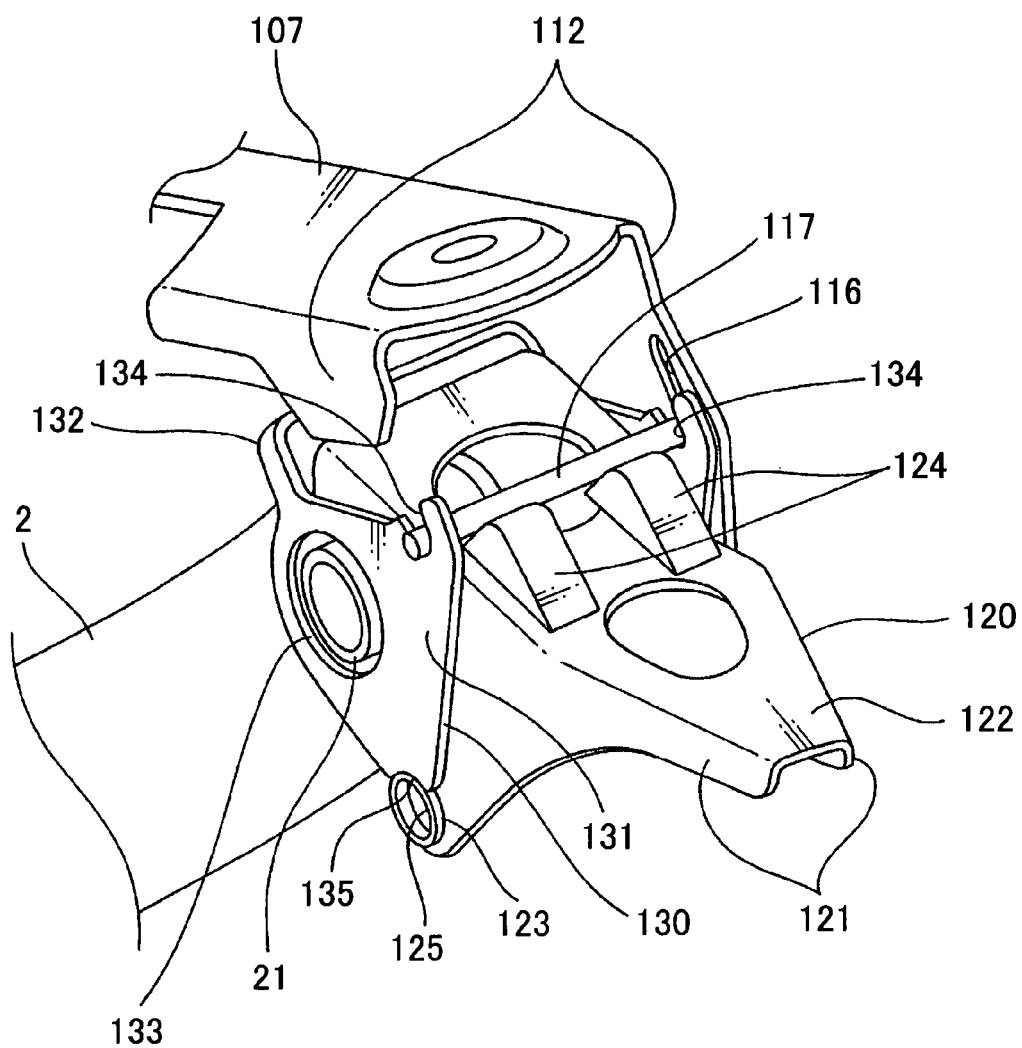
FIG. 17 is a perspective view of a principal portion of the operating pedal support structure of the seventh embodiment showing, in particular, how elements shown in FIG. 16 are assembled.
Figure 18:
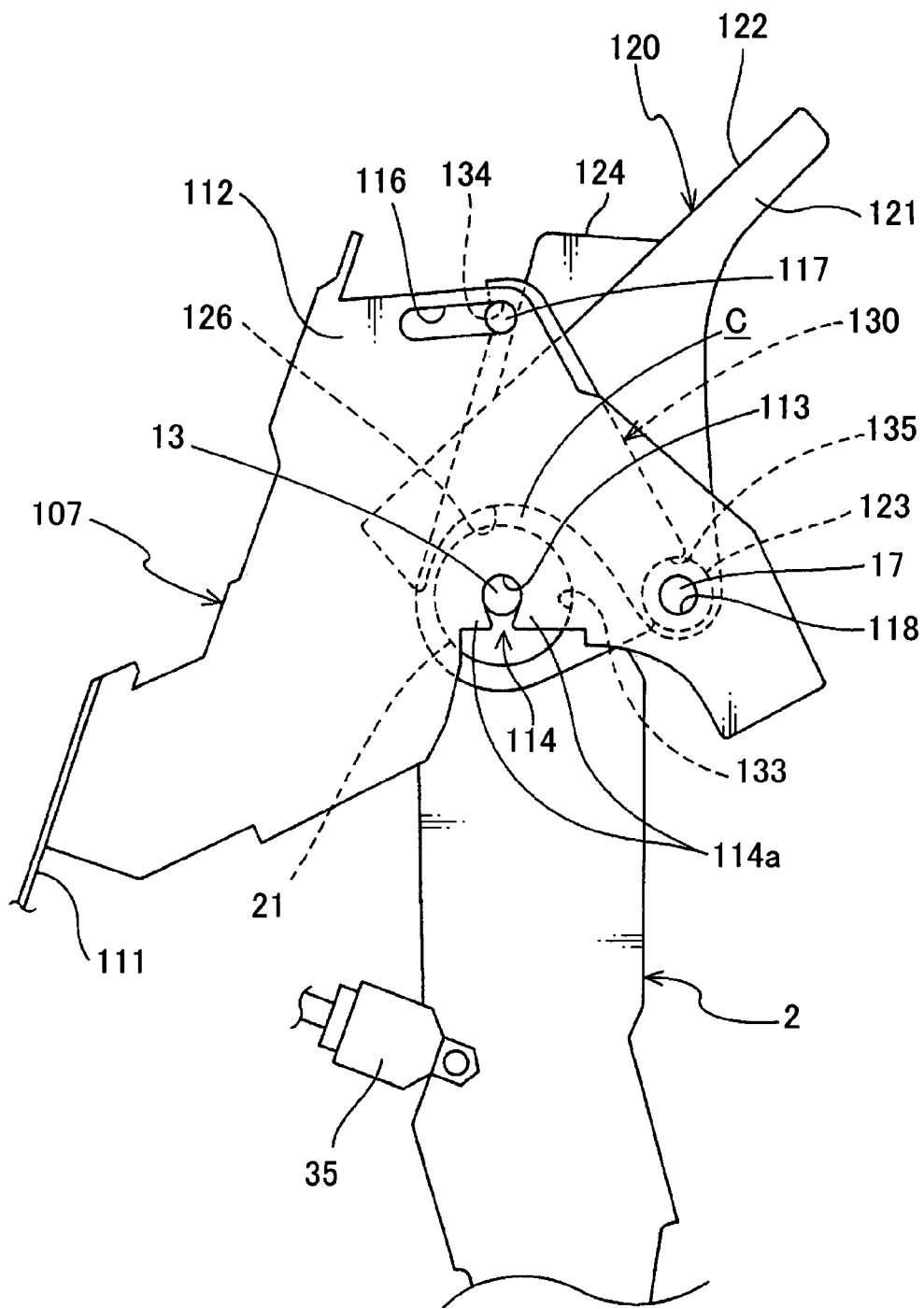
FIG. 18 is a side view of the operating pedal support structure of the seventh embodiment showing, in particular, a state under normal conditions.
Figure 19:
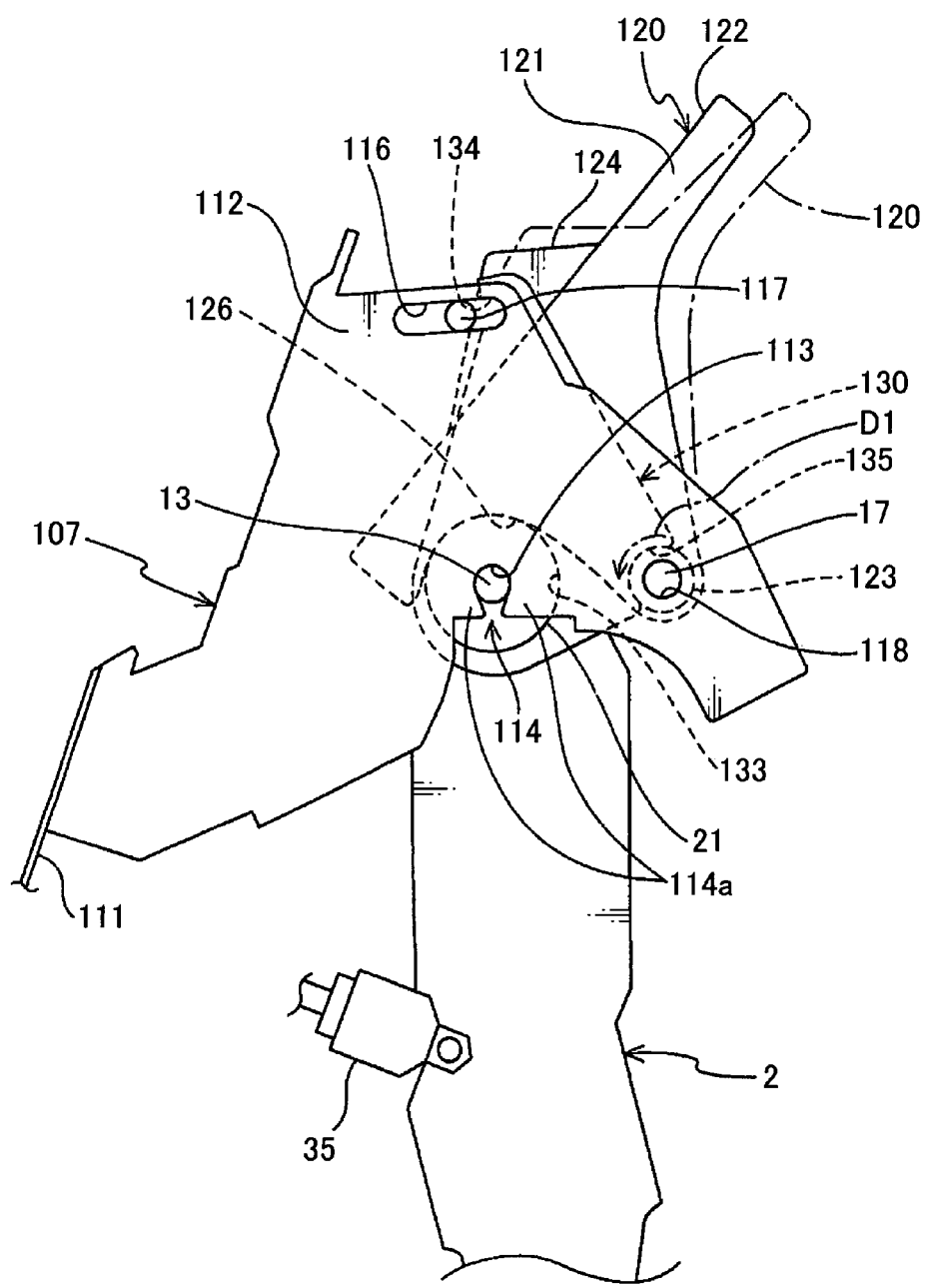
FIG. 19 is a side view of the principal portion of the operating pedal support structure corresponding to FIG. 18 showing, in particular, a state in an early stage of a vehicle collision.
Figure 20:
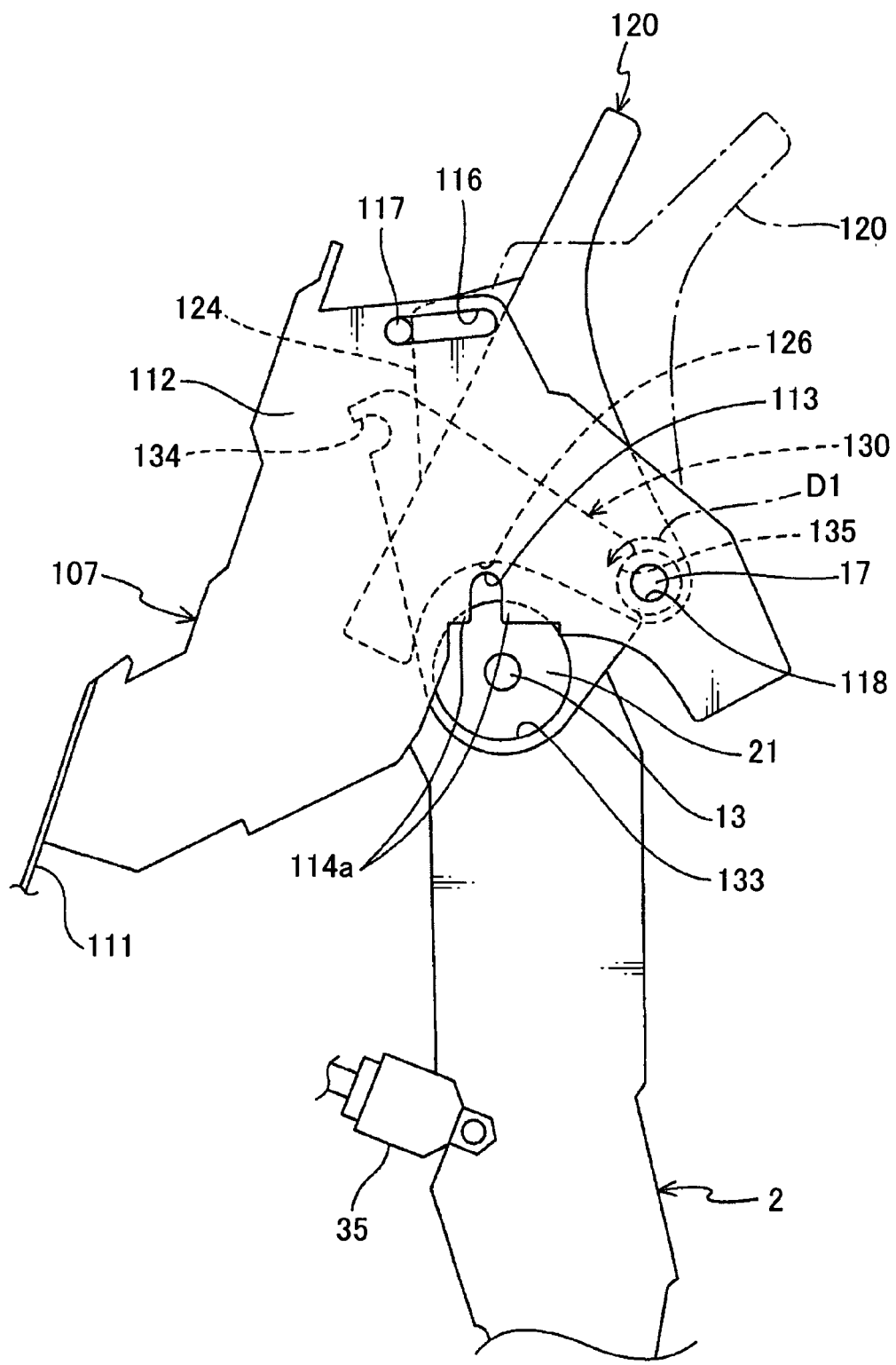
FIG. 20 is a side view of the principal portion of the operating pedal support structure corresponding to FIG. 18 showing, in particular, a state in which a pedal unit has come off as a result of the vehicle collision.

FIGS. 15 to 20 show an operating pedal support structure according to a seventh embodiment of the invention. FIG. 15 is a partially sectional side view showing an overall construction of the operating pedal support structure of the seventh embodiment, FIG. 16 is an exploded perspective view of the operating pedal support structure of the seventh embodiment, FIG. 17 is a perspective view of a principal portion of the operating pedal support structure of the seventh embodiment showing how elements shown in FIG. 16 are assembled, FIG. 18 is a side view of the operating pedal support structure of the seventh embodiment showing, in particular, a state under normal conditions, and FIGS. 19 and 20 are side views of the principal portion of the operating pedal support structure corresponding to FIG. 18 showing, in particular, a state during a vehicle collision.

Referring to FIGS. 15 to 20, the operating pedal support structure of the seventh embodiment includes, instead of the pedal bracket 3, the pivotable lever 5 and the shaft retainers 51 (61, 72, 81, 91, 101) of the first to sixth embodiments, a pedal bracket 103, a pivotable lever 120 and a shaft retainer 130 which are shaped differently from their counterparts of the foregoing embodiments. Elements of the seventh embodiment structured substantially in the same way as in the foregoing embodiments are designated by the same symbols and a detailed description of such elements are not given below again.

As in the foregoing first to sixth embodiments, the pedal bracket 103 of the seventh embodiment includes a mounting base plate 111 which is firmly bolted to the dash panel 1 and a bracket frame 107 having left and right side plate portions 112 extending rearward from left and right end portions of the mounting base plate 111. In the left and right side plate portions (bracket arms) 112 of the bracket frame 107, there are formed supporting holes 113 in which the first pivot shaft 13 constituting a pivotal axis of the pedal unit 2 is fitted. The pedal unit 2 is pivotably supported by the bracket frame 107 with the first pivot shaft 13 passed through these supporting holes 113 in the bracket frame 107 and through the boss portions 21 of the pedal unit 2. In the example shown in FIG. 16, a washer 142 is placed between the nut 22 fitted on the far end of the first pivot shaft 13 and one side plate portion 112 of the bracket frame 107 to protect an outside surface area of the side plate portion 112 surrounding the facing supporting hole 113 from damage.

In each of the side plate portions 112 of the bracket frame 107, there is formed a cutout 140 having a width larger than the diameter of the first pivot shaft 13 along the longitudinal direction of the vehicle immediately below the supporting hole 113. Furthermore, a narrower confinement channel 114 is formed in each side plate portion 112 of the bracket frame 107. The confinement channel 114 extends continuously downward from the supporting hole 113 to the cutout 140 as illustrated in FIG. 16, the confinement channel 114 having a width smaller than the diameter of the supporting hole 113, or the diameter of the first pivot shaft 13. A pair of front and rear projections 114a is formed in each side plate portion 112 of the bracket frame 107, the front and rear projections 114a facing each other with the confinement channel 114 located in between. This pair of front and rear projections 114a (each of which corresponds to the retaining part mentioned in the appended claims) formed on an edge of each supporting hole 113 supports the first pivot shaft 13 fitted in the supporting hole 113 on each side of the bracket frame 107 from below, thus preventing the first pivot shaft 13 from coming off the supporting holes 113 and moving downward under normal conditions. The front and rear projections 114a on each side of the bracket frame 107 are caused to forcibly deform by the first pivot shaft 13 when a large downward thrust is exerted on the first pivot shaft 13 by the pivotable lever 120 in the event of a collision of the vehicle, thus spreading out the confinement channel 114 and allowing the first pivot shaft 13 to come off the supporting holes 113.

Supporting holes 118 in which the second pivot shaft 17 constituting a pivotal axis of the pivotable lever 120 is fitted are formed in the left and right side plate portions 112 of the bracket frame 107. With the second pivot shaft 17 fitted in the pedal bracket 103, passing through left and right through holes 125 formed in the pivotable lever 120 (as will be later discussed in detail), the pivotable lever 120 is supported pivotably on the second pivot shaft 17.

In the present embodiment, there is formed a pair of slots 116 in the left and right side plate portions 112 of the bracket frame 107 near upper edges of the individual side plate portions 112, the left and right slots 116 extending side by side straight along the longitudinal direction of the vehicle body. A shaft 117 is fitted in these slots 116 as if to bridge the left and right side plate portions 112 of the bracket frame 107 along the lateral direction of a vehicle body so that the shaft 117 is held by the bracket frame 107 slidably in the slots 116 along the longitudinal direction of the vehicle body. Although not illustrated, the shaft 117 is provided at both ends thereof with a retaining mechanism including retaining rigs or the like which keep the shaft 117 from slipping off the slots 116 in the bracket frame 107 in the lateral direction.

The pivotable lever 120 includes left and right side plate portions 121 disposed parallel to inside surfaces of the respective side plate portions 112 of the bracket frame 107 as well as a top plate portion 122 interconnecting upper ends of the left and right side plate portions 121. The left and right side plate portions 121 each have a concave arc-shaped edge 126 which is located immediately above one of the boss portions 21 of the pedal unit 2 with a specific clearance C formed between a cylindrical outer surface of each boss portion 21 and the facing arc-shaped edge 126 under normal conditions as shown in FIG. 18. It is to be noted that, unlike FIG. 3 showing a side view of the operating pedal support structure of the first embodiment, for example, FIG. 18 shows especially the state of the bracket frame 107, the pivotable lever 120, etc. of the operating pedal support structure as viewed from outside along the lateral direction of the vehicle body as in the following embodiments of the invention.

The aforementioned through holes 125 for passing the second pivot shaft 17 are formed close to lower ends of the side plate portions 121 of the pivotable lever 120 extending to the rear of the respective arcuate edges 126. The through holes 125 are surrounded by ringlike flanges 123 formed on outside surfaces of the side plate portions 121 of the pivotable lever 120, the ringlike flanges 123 protruding outward along the lateral direction of the vehicle body. Additionally, on an outside surface of the top plate portion 122 of the pivotable lever 120, there is formed a pair of pushing parts 124 which go into contact with the shaft 117 held in the slots 116 formed in the bracket frame 107 and thrust the shaft 117 frontward when the pivotable lever 120 pivots in the event of a vehicle collision.

Like the shaft retainers 51, 61, etc. of the foregoing embodiments, the aforementioned shaft retainer 130 serves a function of preventing the pedal unit 2 from coming off downward unexpectedly under conditions where a relatively large load is applied to the pedal unit 2 as a result of a depression thereof by the driver, for example. The shaft retainer 130 includes left and right side plate portions 131 extending along the inside surfaces of the side plate portions 112 of the bracket frame 107 and the outside surfaces of the side plate portions 121 of the pivotable lever 120 therebetween as well as a linkage rod 132 interconnecting the two side plate portions 131 at lower edge parts thereof.

In the individual side plate portions 131 of the shaft retainer 130, there are formed through holes 133 in which the boss portions 21 of the pedal unit 2 are fitted. In this embodiment, the through holes 133 have a diameter generally equal to that of each boss portion 21. As can be seen from FIGS. 17 and 18, the shaft retainer 130, when assembled into the operating pedal support structure, is supported in such a manner that each of the side plate portion 131 of the shaft retainer 130 is located between the inside surface of the side plate portion 112 of the bracket frame 107 and the outside surface of the side plate portion 121 of the pivotable lever 120 on each side. As the boss portions 21 of the pedal unit 2 are fitted in the through holes 133 formed in the shaft retainer 130 with the aid of the first pivot shaft 13, the pedal unit 2 is kept from coming off downward by the shaft retainer 130 under normal conditions. Specifically, under normal conditions, lower edges of the through holes 133 in the shaft retainer 130 that are located below the first pivot shaft 13 and the boss portions 21 surrounding the first pivot shaft 13 support the boss portions 21 from lower parts thereof, whereby the boss portions 21 of the pedal unit 2 are kept from coming off downward. The lower edges of the through holes 133 of this operating pedal support structure, correspond to the retaining parts 51c, 61c, etc. of the foregoing embodiments.

At an upper forward end and a rear end of each side plate portion 131 of the shaft retainer 130, there are formed concave cutouts constituting first and second hooking parts 134, 135 which are shaped to fit on a cylindrical outer surface of the aforementioned shaft 117 and cylindrical outer surfaces of the ringlike flanges 123 of the pivotable lever 120, respectively. Under normal conditions, the first hooking parts 134 engage with the shaft 117 which is held in the slots 116 formed in the bracket frame 107 while the second hooking parts 135 engage with the ringlike flanges 123 provided on the outside surfaces of the left and right side plate portions 121 of the pivotable lever 120, whereby the shaft retainer 130 is held in position as shown in FIGS. 17 and 18. In this condition, the shaft 117 is maintained at rearmost ends of the slots 116 in the bracket frame 107.

When a downward load is applied to the pedal unit 2 under normal conditions shown in FIG. 18 as a result of depression of the pedal unit 2 by the driver, for example, the boss portions 21 of the pedal unit 2 displaced downward exert a downward pulling force on the shaft retainer 130. Since the first and second hooking parts 134, 135 of the shaft retainer 130 are hooked respectively on the shaft 117 supported by the bracket frame 107 and on the ringlike flanges 123 of the pivotable lever 120 as mentioned above, however, the shaft retainer 130 is held in position shown in FIG. 18 regardless of the pulling force. The operating pedal support structure prevents the pedal unit 2 from coming off the bracket frame 107 under normal conditions as the shaft retainer 130 is normally held in position in the aforementioned fashion. Thus, even under conditions where a relatively large load is applied to the pedal unit 2 as a result of depression thereof by the driver, for example, the shaft retainer 130 sustains the load, thereby preventing the pedal unit 2 from coming off downward unexpectedly.

In the event of a vehicle collision, on the other hand, the bracket frame 107 is displaced rearward together with the dash panel 1 (refer to FIG. 15) and a rear end of the pivotable lever 120 eventually goes into contact with the side member 33. Consequently, the pivotable lever 120 pivots on the second pivot shaft 17 in the counterclockwise direction as shown by an arrow D1 in FIGS. 19 and 20 in which an alternate long and short dashed line shows how a rear portion of the pivotable lever 120 is positioned before this pivoting motion. As a result of the pivoting motion of the pivotable lever 120, the pushing parts 124 of the pivotable lever 120 force the shaft 117 held in the left and right slots 116 formed in the bracket frame 107 from behind, thereby causing the shaft 117 to slide frontward (leftward as illustrated) along the two slots 116.

When displaced just beyond a specified amount, the shaft 117 is disengaged from the first hooking parts 134 of the shaft retainer 130. As a consequence, the aforementioned function of the shaft retainer 130 to prevent the pedal unit 2 from coming off downward from the pedal bracket 103 is disabled and, at this point, the pedal unit 2 remains suspended by the bracket frame 107 simply with the aid of the first pivot shaft 13 which is fitted in the supporting holes 113 formed in the left and right side plate portions 112 of the bracket frame 107. The clearance C shown in FIG. 18 is determined such that the arc-shaped edges 126 of the pivotable lever 120 come in contact with the cylindrical outer surfaces of the boss portions 21 of the pedal unit 2 in this condition.

When the pivotable lever 120 further pivots frontward beyond a position shown in FIG. 19, the arc-shaped edges 126 of the pivotable lever 120 exert a downward thrust on the boss portions 21 of the pedal unit 2 and the first pivot shaft 13 remaining in the boss portions 21, thereby widening the confinement channels 114 formed in the left and right side plate portions 112 of the bracket frame 107 due to plastic deformation of the front and rear projections 114a thereof and releasing the first pivot shaft 13 from the supporting holes 113 through the widened confinement channels 114. Consequently, the pedal unit 2 comes off the bracket frame 107 together with the shaft retainer 130 which has already been disengaged from the bracket frame 107 as shown in FIG. 20.

In this embodiment, the pivotable lever 120 is caused to pivot frontward in the event of a vehicle collision. The result is that the shaft 117 and the shaft retainer 130 are disengaged from each other, whereby the shaft retainer 130 is brought from a restrictive state to a nonrestrictive state in which the shaft retainer 130 no longer keeps the pedal unit 2 from coming off downward. As the pivotable lever 120 forces the boss portions 21 of the pedal unit 2 downward in this condition, the pedal unit 2 comes off the bracket frame 107 as illustrated in FIG. 20 in a reliable fashion in the event of a vehicle collision. The present embodiment employs an arrangement which releases the pedal unit 2 from the bracket frame 107 immediately after the first pivot shaft 13 comes off the supporting holes 113 formed in the bracket frame 107. This arrangement serves to reliably prevent the pedal unit 2 and the tread plate 34 from moving rearward in the event of a vehicle collision as in eight to eleventh embodiments of the invention which will be subsequently discussed.

The below-described eight to eleventh embodiments are based on the foregoing seventh embodiment. In the eight to eleventh embodiments discussed hereinbelow, elements like those of the seventh embodiment are designated by the same symbols and a detailed description of such elements are not given below. A pedal bracket and a bracket frame used in the eight to eleventh embodiments are slightly different in construction from those of the seventh embodiment but are generally the same as those of the seventh embodiment in external shape. Thus, these elements are designated by using the same numerals 103, 107. On the other hand, pivotable levers and shaft retainers used in the eight to eleventh embodiments below differ from those of the seventh embodiment in construction and shape, so that these elements are designated by different reference numerals below.

Eighth Embodiment

Figure 21:
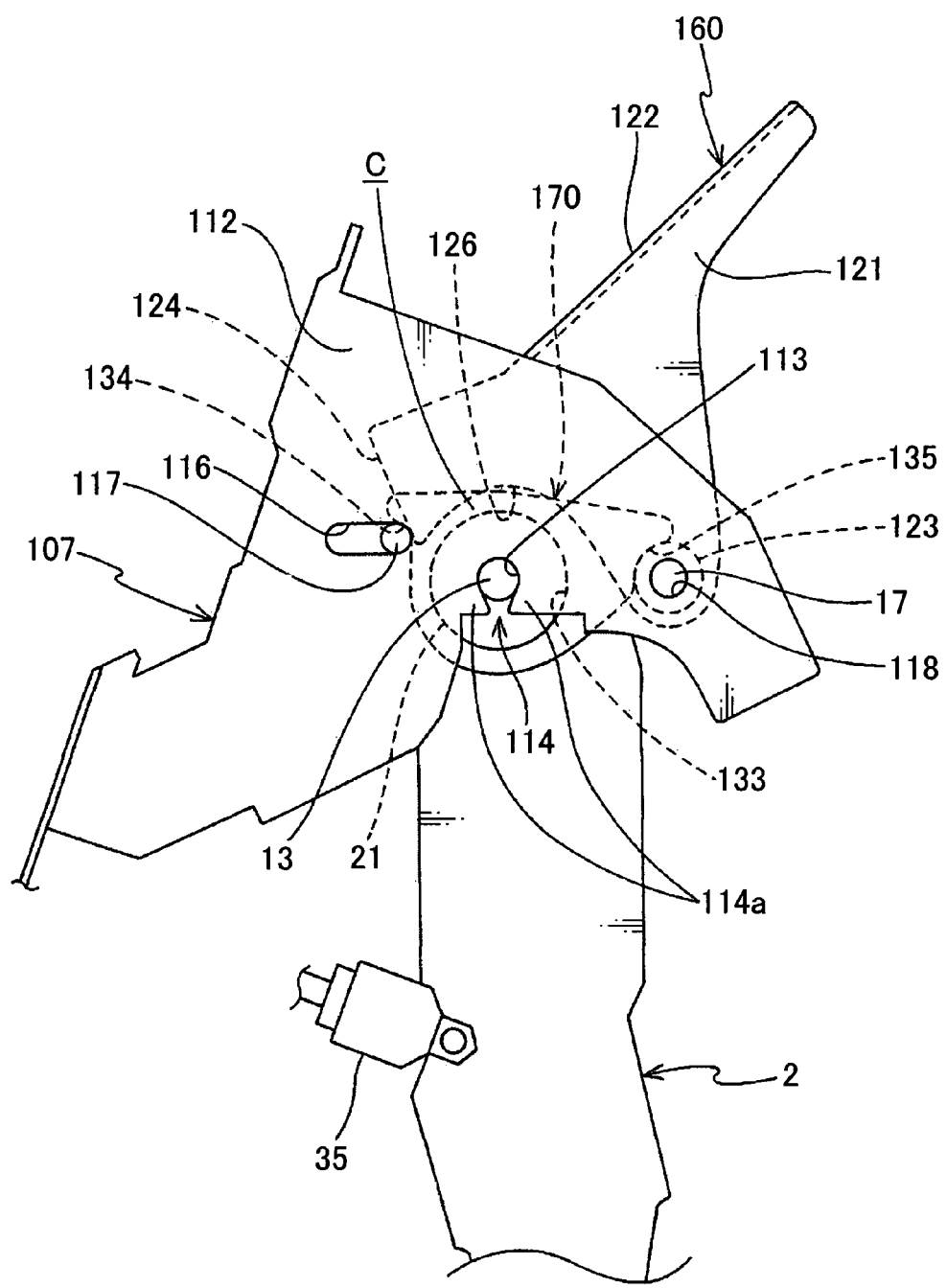
FIG. 21 is a side view of a principal portion of a support structure for an operating pedal according to an eighth embodiment of the invention showing, in particular, a state under normal conditions.
Figure 22:
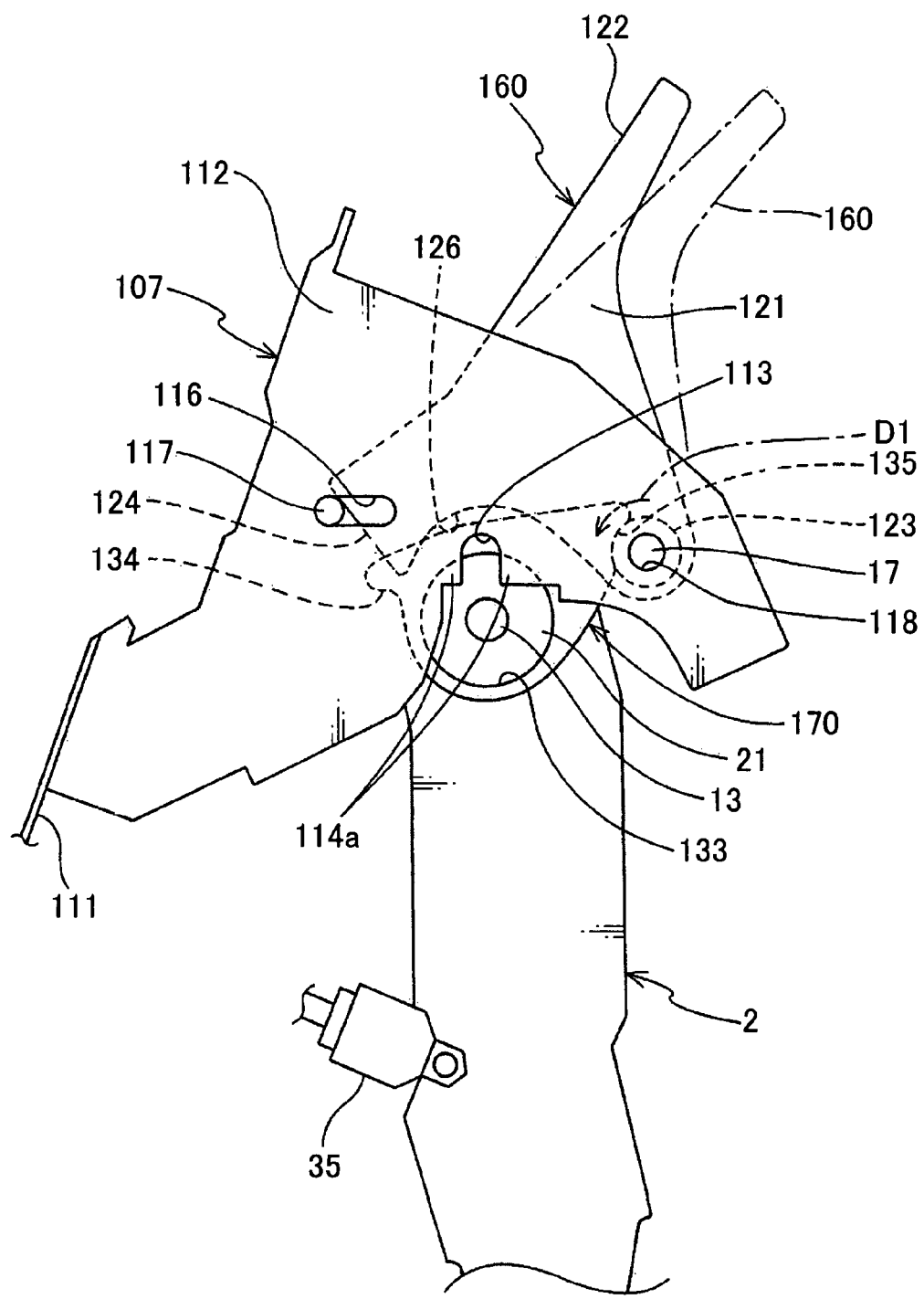
FIG. 22 is a side view of the principal portion of the operating pedal support structure of the eighth embodiment showing, in particular, a state in which a pedal unit has come off as a result of a vehicle collision.

FIGS. 21 and 22 are diagrams showing an operating pedal support structure according to the eighth embodiment of the invention, in which FIG. 21 shows a state under normal conditions and FIG. 22 shows a state wherein the pedal unit 2 has come off as a result of a vehicle collision.

The operating pedal support structure of the eighth embodiment is characterized in that slots 116 slidably holding the shaft 117 in the bracket frame 107 are formed at lower locations than in the seventh embodiment. Also, in the eighth embodiment provided with a pivotable lever 160 instead of the pivotable lever 120, a forward end of a top plate portion 122 of the pivotable lever 160 serves as a pushing part 124 for pushing forward the shaft 117 supported by the bracket frame 107 when the pivotable lever 160 pivots.

A shaft retainer 170 of this embodiment has at forward and rear ends thereof first hooking parts 134 which engage with the shaft 117 held in the slots 116 formed in the bracket frame 107 and second hooking parts 135 which engage with ringlike flanges 123 formed on outside surfaces of portions 121 of the pivotable lever 160, respectively.

Under normal conditions shown in FIG. 21, the pedal unit 2 is suspended by the bracket frame 107 with the first pivot shaft 13 fitted through the boss portions 21 of the pedal unit 2 and the supporting holes 113 formed in the bracket frame 107, and each of concave arc-shaped edges 126 of the pivotable lever 160 is located immediately above one of the boss portions 21 of the pedal unit 2 with a specific clearance C formed between the cylindrical outer surface of each boss portion 21 and the facing arc-shaped edge 126. Also, as the first and second hooking parts 134, 135 of the shaft retainer 170 engage with the shaft 117 and the ringlike flanges 123 of the pivotable lever 160, respectively, the shaft retainer 170 is held in position as shown in FIG. 21. Even if a downward load is applied to the pedal unit 2 in the above-described condition, causing the first pivot shaft 13 to almost come off the supporting holes 113 in the bracket frame 107, the shaft retainer 170 remaining in its original position keeps the boss portions 21 of the pedal unit 2 in position. This structure of the embodiment serves to reliably prevent the pedal unit 2 from coming off downward from the bracket frame 107 under normal conditions.

In the event of a vehicle collision, on the other hand, the bracket frame 107 is displaced rearward together with the dash panel 1 (refer to FIG. 15) and a rear end of the pivotable lever 160 eventually goes into contact with the side member 33. Consequently, the pivotable lever 160 pivots on the second pivot shaft 17 in the counterclockwise direction as shown by an arrow D1 in FIG. 22 in which an alternate long and short dashed line shows how a rear portion of the pivotable lever 160 is positioned before this pivoting motion. As a result of the pivoting motion of the pivotable lever 160, the pushing part 124 of the pivotable lever 160 forces the shaft 117 held in the left and right slots 116 formed in the bracket frame 107 from behind, thereby causing the shaft 117 to slide frontward (leftward as illustrated) along the two slots 116.

When displaced just beyond a specified amount, the shaft 117 is disengaged from the first hooking parts 134 of the shaft retainer 170 in the same way as in the seventh embodiment. As a consequence, the aforementioned function of the shaft retainer 170 to prevent the pedal unit 2 from coming off downward from the pedal bracket 103 is disabled. When the pivotable lever 160 further pivots frontward, the arc-shaped edges 126 of the pivotable lever 160 exert a downward thrust on the respective boss portions 21 of the pedal unit 2 and the first pivot shaft 13 remaining in the boss portions 21, thereby widening the confinement channels 114 formed in the left and right side plate portions 112 of the bracket frame 107 due to plastic deformation of the front and rear projections 114a thereof and releasing the first pivot shaft 13 from the supporting holes 113 through the widened confinement channels 114. Consequently, the pedal unit 2 comes off the bracket frame 107 together with the shaft retainer 170 which has already been disengaged from the bracket frame 107 as shown in FIG. 22.

In this embodiment, the pivotable lever 160 is caused to pivot frontward in the event of a vehicle collision. The result is that the shaft 117 and the shaft retainer 170 are disengaged from each other, whereby the shaft retainer 170 is brought from a restrictive state to a nonrestrictive state in which the shaft retainer 170 no longer keeps the pedal unit 2 from coming off downward. As the pivotable lever 160 forces the boss portions 21 of the pedal unit 2 downward in this condition, the pedal unit 2 comes off the bracket frame 107 as illustrated in FIG. 22 in a reliable fashion in the event of a vehicle collision.

Ninth Embodiment

Figure 23:
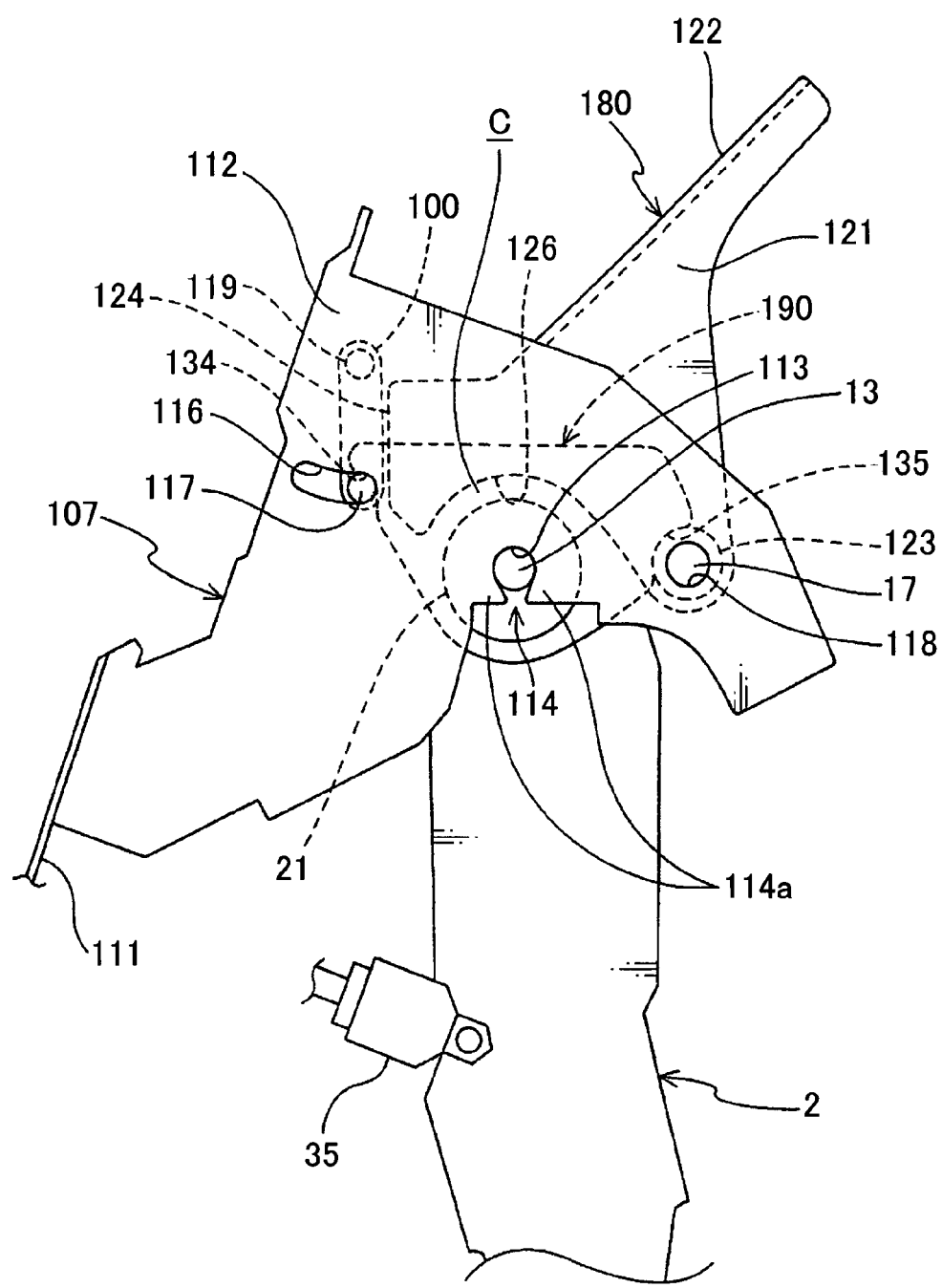
FIG. 23 is a side view of a principal portion of a support structure for an operating pedal according to a ninth embodiment of the invention showing, in particular, a state under normal conditions.
Figure 24:
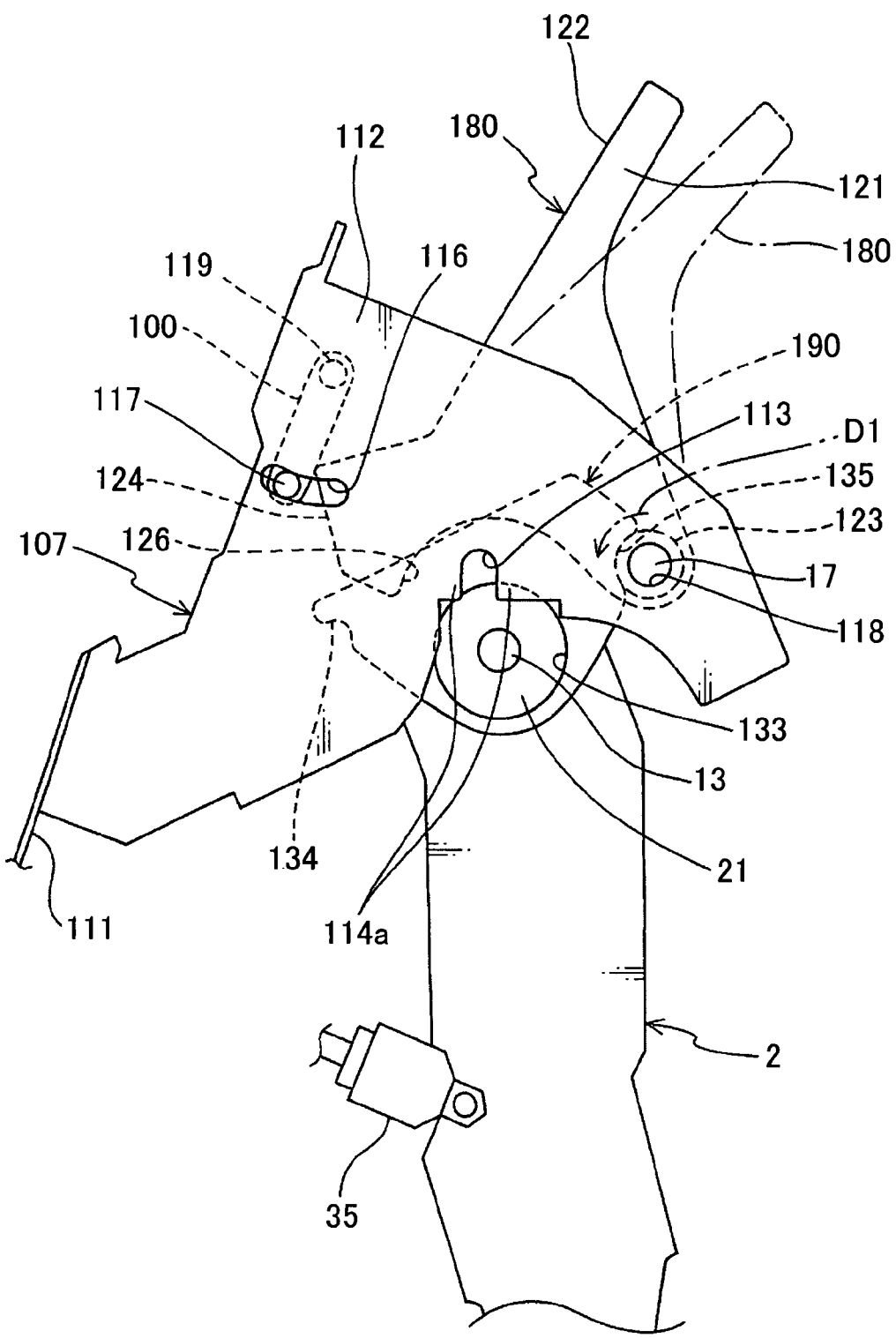
FIG. 24 is a side view of the principal portion of the operating pedal support structure of the ninth embodiment showing, in particular, a state in which a pedal unit has come off as a result of a vehicle collision.

FIGS. 23 and 24 are diagrams showing an operating pedal support structure according to the ninth embodiment of the invention, in which FIG. 23 shows a state under normal conditions and FIG. 24 shows a state wherein the pedal unit 2 has come off as a result of a vehicle collision.

The operating pedal support structure of this embodiment includes left and right support bars 100 which are connected to pin members 119 provided on inside surfaces of left and right side plate portions 112 of the bracket frame 107, respectively, so that the support bars 100 can pivot on the respective pin members 119. In this embodiment, the shaft 117 held in slots 116 formed in the left and right side plate portions 112 of the bracket frame 107 is attached to free ends of the left and right support bars 100. The support bars 100 are so positioned as to be pushed forward by pushing parts 124 of a pivotable lever 180 during pivoting motion thereof. Thus, when the support bars 100 are pushed by the pivotable lever 180, the shaft 117 moves along an arc-shaped path which is drawn about an axis of each pin member 119 as seen in side view. Accordingly, the slots 116 in the side plate portions 112 of the bracket frame 107 are each shaped into an arcuate form corresponding to the moving path of the shaft 117 as depicted in the side views of FIGS. 23 and 24.

Under normal conditions shown in FIG. 23, the pedal unit 2 is suspended by the bracket frame 107 with the first pivot shaft 13 fitted through the boss portions 21 of the pedal unit 2 and the supporting holes 113 formed in the bracket frame 107, and each of concave arc-shaped edges 126 of the pivotable lever 180 is located immediately above one of the boss portions 21 of the pedal unit 2 with a specific clearance C formed between the cylindrical outer surface of each boss portion 21 and the facing arc-shaped edge 126. Also, as first and second hooking parts 134, 135 of a shaft retainer 190 engage with the shaft 117 held in the slots 116 and ringlike flanges 123 of the pivotable lever 180, respectively, the shaft retainer 190 is held in position as shown in FIG. 23. Even if a downward load is applied to the pedal unit 2 in the above-described condition, causing the first pivot shaft 13 to almost come off the supporting holes 113 in the bracket frame 107, the shaft retainer 190 remaining in its original position keeps the boss portions 21 of the pedal unit 2 in position. This structure of the embodiment serves to reliably prevent the pedal unit 2 from coming off downward from the bracket frame 107 under normal conditions.

In the event of a vehicle collision, on the other hand, the bracket frame 107 is displaced rearward together with the dash panel 1 (refer to FIG. 15) and a rear end of the pivotable lever 180 eventually goes into contact with the side member 33. Consequently, the pivotable lever 180 pivots on the second pivot shaft 17 in the counterclockwise direction as shown by an arrow D1 in FIG. 24 in which an alternate long and short dashed line shows how a rear portion of the pivotable lever 180 is positioned before this pivoting motion. As a result of the pivoting motion of the pivotable lever 180, the pushing parts 124 of the pivotable lever 180 pivoting in the aforementioned direction force the shaft 117 held in the left and right slots 116 formed in the bracket frame 107 from behind, thereby causing the shaft 117 to slide frontward (leftward as illustrated) along the two slots 116. In this embodiment, the shaft 117 is pushed frontward via the support bars 100, so that the shaft 117 can slide smoothly along the slots 116.

When displaced just beyond a specified amount, the shaft 117 is disengaged from the first hooking parts 134 of the shaft retainer 190 in the same way as in the seventh and eighth embodiments. As a consequence, the aforementioned function of the shaft retainer 190 to prevent the pedal unit 2 from coming off downward from the pedal bracket 103 is disabled. When the pivotable lever 180 further pivots frontward, the arc-shaped edges 126 of the pivotable lever 180 exert a downward thrust on the respective boss portions 21 of the pedal unit 2 and the first pivot shaft 13 remaining in the boss portions 21, thereby widening the confinement channels 114 formed in the left and right side plate portions 112 of the bracket frame 107 due to plastic deformation of the front and rear projections 114a thereof and releasing the first pivot shaft 13 from the supporting holes 113 through the widened confinement channels 114. Consequently, the pedal unit 2 comes off the bracket frame 107 together with the shaft retainer 190 which has already been disengaged from the bracket frame 107 as shown in FIG. 24.

In this embodiment, the pivotable lever 180 is caused to pivot frontward in the event of a vehicle collision. The result is that the shaft 117 and the shaft retainer 190 are disengaged from each other, whereby the shaft retainer 190 is brought from a restrictive state to a nonrestrictive state in which the shaft retainer 190 no longer keeps the pedal unit 2 from coming off downward. As the pivotable lever 180 forces the boss portions 21 of the pedal unit 2 downward in this condition, the pedal unit 2 comes off the bracket frame 107 as illustrated in FIG. 24 in a reliable fashion in the event of a vehicle collision.

In particular, the pivotable lever 180 pushes the shaft 117 from behind via the support bars 100 in a forward pivoting motion to release the shaft 117 from the shaft retainer 190 in an early stage of a collision in the operating pedal support structure of this embodiment. It is therefore possible to cause the shaft 117 to slide smoothly along the slots 116 in the side plate portions 112 of the bracket frame 107 and the shaft retainer 190 and the pedal unit 2 to come off the pedal bracket 103 as a result of pivoting of the pivotable lever 180 in a reliable fashion.

Tenth Embodiment

Figure 25:
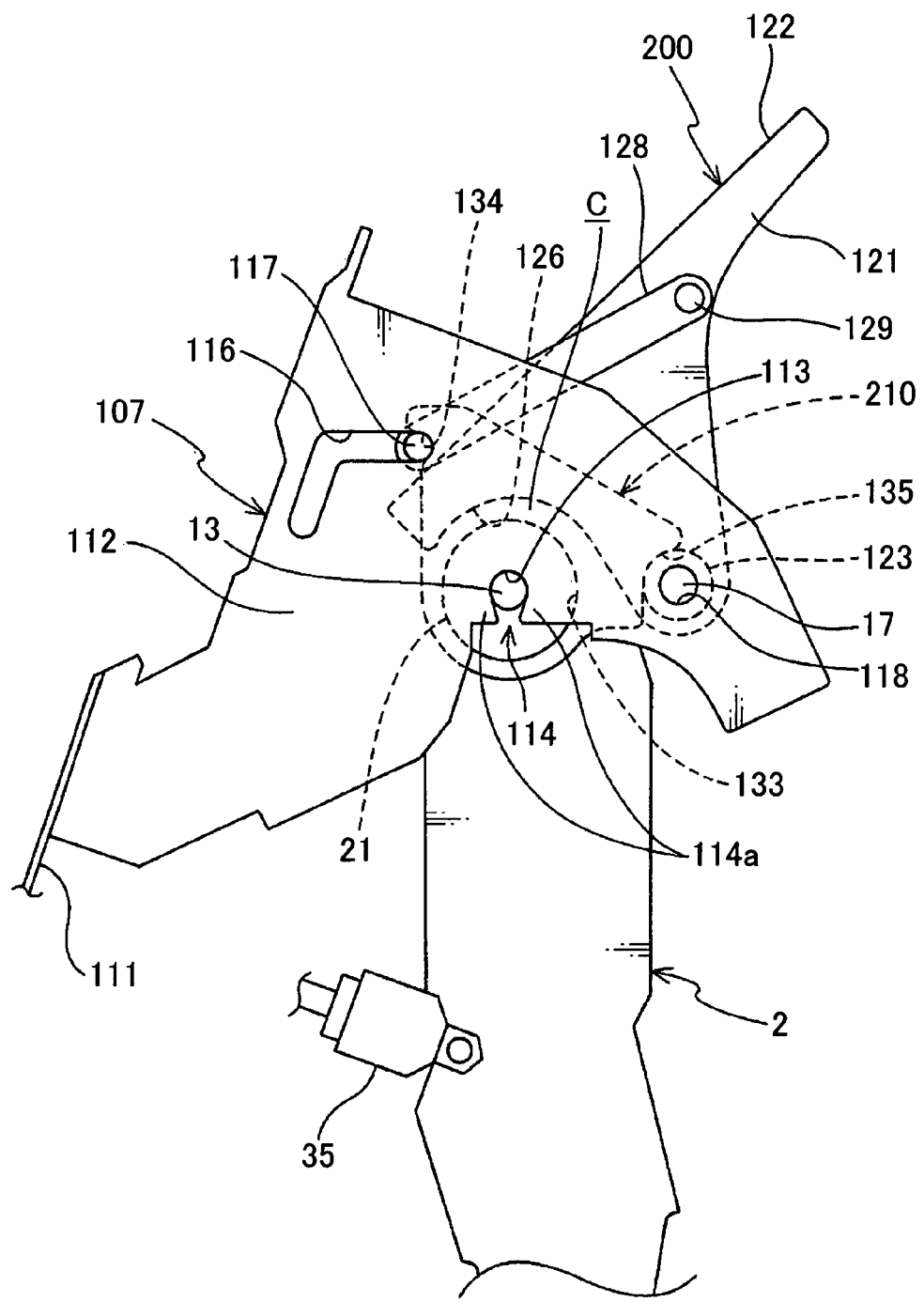
FIG. 25 is a side view of a principal portion of a support structure for an operating pedal according to a tenth embodiment of the invention showing, in particular, a state under normal conditions.
Figure 26:
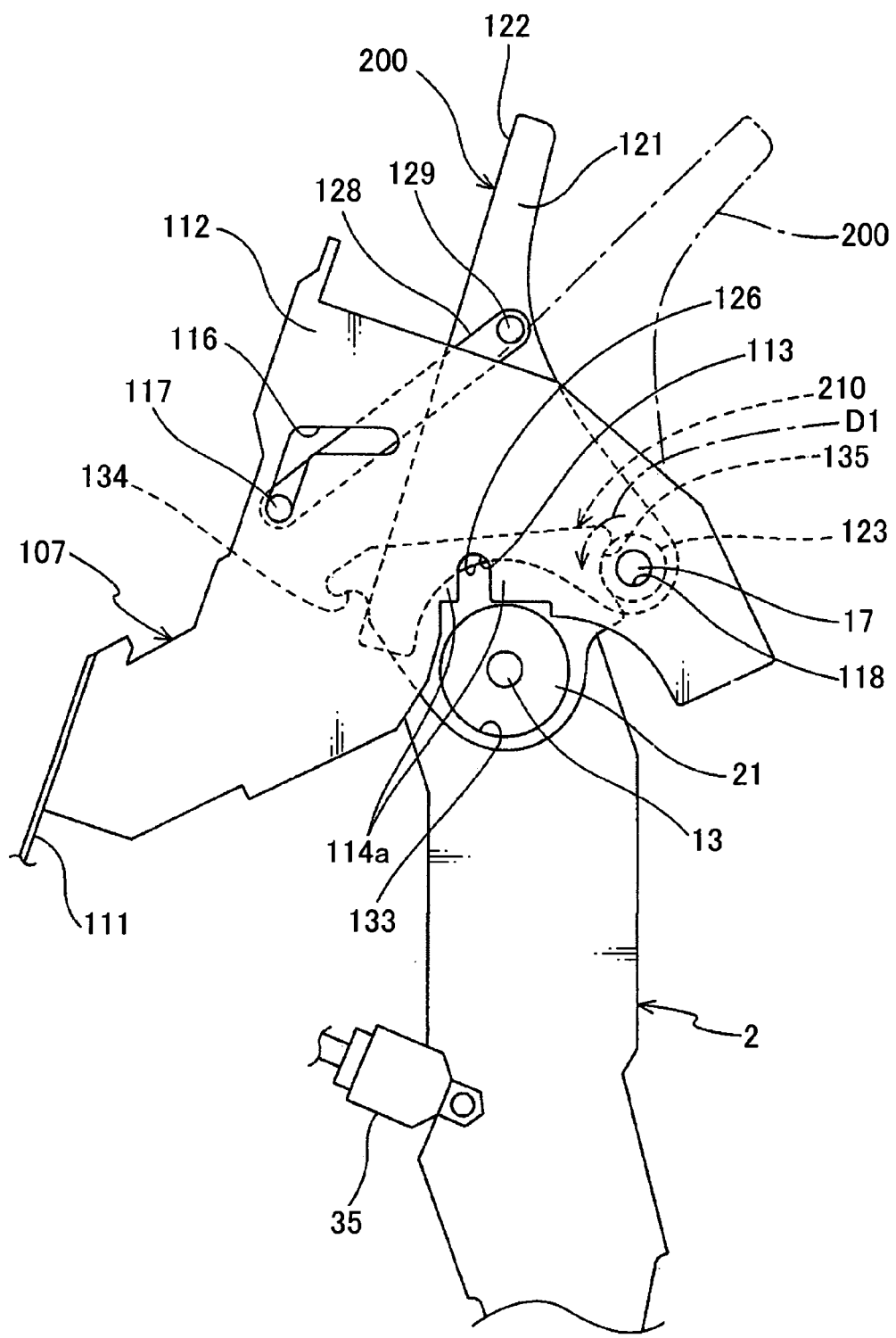
FIG. 26 is a side view of the principal portion of the operating pedal support structure of the tenth embodiment showing, in particular, a state in which a pedal unit has come off as a result of a vehicle collision.

FIGS. 25 and 26 are diagrams showing an operating pedal support structure according to the tenth embodiment of the invention, in which FIG. 25 shows a state under normal conditions and FIG. 26 shows a state wherein the pedal unit 2 has come off as a result of a vehicle collision.

The operating pedal support structure of this embodiment includes left and right link bars 128 which are connected to pin members 129 provided on outside surfaces of left and right side plate portions 121 of a pivotable lever 200, respectively, so that the link bars 128 can pivot on the respective pin members 129. Each of the link bars 128 is disposed to extend along the longitudinal direction of the vehicle body between an inside surface of one side plate portion 112 of the bracket frame 107 and the outside surface of the facing side plate portion 121 of the pivotable lever 200. The shaft 117 held in slots 116 formed in the left and right side plate portions 112 of the bracket frame 107 is joined to free ends of the left and right link bars 128. In this embodiment, the slots 116 are generally L-shaped as seen in side view, each having a rear portion extending horizontally rearward and a front portion extending obliquely down frontward.

Under normal conditions shown in FIG. 25, the pedal unit 2 is suspended by the bracket frame 107 with the first pivot shaft 13 fitted through the boss portions 21 of the pedal unit 2 and the supporting holes 113 formed in the bracket frame 107, and each of concave arc-shaped edges 126 of the pivotable lever 200 is located immediately above one of the boss portions 21 of the pedal unit 2 with a specific clearance C formed between the cylindrical outer surface of each boss portion 21 and the facing arc-shaped edge 126. Also, as first and second hooking parts 134, 135 of a shaft retainer 210 engage with the shaft 117 held in the slots 116 and ringlike flanges 123 provided on the pivotable lever 200, respectively, the shaft retainer 210 is held in position as shown in FIG. 25. Even if a downward load is applied to the pedal unit 2 in the above-described condition, causing the first pivot shaft 13 to almost come off the supporting holes 113 in the bracket frame 107, the shaft retainer 210 remaining in its original position keeps the boss portions 21 of the pedal unit 2 in position. This structure of the embodiment serves to reliably prevent the pedal unit 2 from coming off downward from the bracket frame 107 under normal conditions.

In the event of a vehicle collision, on the other hand, the bracket frame 107 is displaced rearward together with the dash panel 1 (refer to FIG. 15) and a rear end of the pivotable lever 200 eventually goes into contact with the side member 33. Consequently, the pivotable lever 200 pivots on the second pivot shaft 17 in the counterclockwise direction as shown by an arrow D1 in FIG. 26 in which an alternate long and short dashed line shows how a rear portion of the pivotable lever 200 is positioned before this pivoting motion. As a result of the pivoting motion of the pivotable lever 200, the shaft 117 held in the left and right slots 116 formed in the bracket frame 107 is forced frontward via the link bars 128 fitted to the pivotable lever 200 pivotably on the respective pin members 129, thereby causing the shaft 117 to slide frontward (leftward as illustrated) and then obliquely downward along the two slots 116. In this embodiment, the shaft 117 is pushed frontward via the pivotably mounted link bars 128, so that the shaft 117 can slide smoothly along the slots 116.

When displaced just beyond a specified amount, the shaft 117 is disengaged from the first hooking parts 134 of the shaft retainer 210 in the same way as in the seventh to ninth embodiments. As a consequence, the aforementioned function of the shaft retainer 210 to prevent the pedal unit 2 from coming off downward from the pedal bracket 103 is disabled. When the pivotable lever 200 further pivots frontward, the arc-shaped edges 126 of the pivotable lever 200 exert a downward thrust on the respective boss portions 21 of the pedal unit 2 and the first pivot shaft 13 remaining in the boss portions 21, thereby widening the confinement channels 114 formed in the left and right side plate portions 112 of the bracket frame 107 due to plastic deformation of the front and rear projections 114a thereof and releasing the first pivot shaft 13 from the supporting holes 113 through the widened confinement channels 114. Consequently, the pedal unit 2 comes off the bracket frame 107 together with the shaft retainer 210 which has already been disengaged from the bracket frame 107 as shown in FIG. 26.

In this embodiment, the pivotable lever 200 is caused to pivot frontward in the event of a vehicle collision. The result is that the shaft 117 and the shaft retainer 210 are disengaged from each other, whereby the shaft retainer 210 is brought from a restrictive state to a nonrestrictive state in which the shaft retainer 210 no longer keeps the pedal unit 2 from coming off downward. As the pivotable lever 200 forces the boss portions 21 of the pedal unit 2 downward in this condition, the pedal unit 2 comes off the bracket frame 107 as illustrated in FIG. 26 in a reliable fashion in the event of a vehicle collision.

In particular, the pivotable lever 200 pushes the shaft 117 from behind via the pivotably mounted link bars 128 in a forward pivoting motion to release the shaft 117 from the shaft retainer 210 in an early stage of a collision in the operating pedal support structure of this embodiment. It is therefore possible to cause the shaft 117 to slide smoothly along the slots 116 in the side plate portions 112 of the bracket frame 107 and the shaft retainer 210 and the pedal unit 2 to come off the pedal bracket 103 as a result of pivoting of the pivotable lever 200 in a reliable fashion even when the angle of pivoting of the pivotable lever 200 is relatively small.

Eleventh Embodiment

While the slots 116 for slidably holding the shaft 117 are formed in the left and right side plate portions 112 of the bracket frame 107 in the operating pedal support structures of the seventh to tenth embodiments discussed heretofore, the provision of these slots 116 may result in a reduction in the structural strength of the bracket frame 107. One approach to avoiding such a reduction in the structural strength would be to provide additional retaining members for holding the shaft 117 on the inside surface of each side plate portion 112 of the bracket frame 107 under normal conditions. The eleventh embodiment discussed hereinbelow employs such an arrangement to overcome the aforementioned problem.

Figure 27:
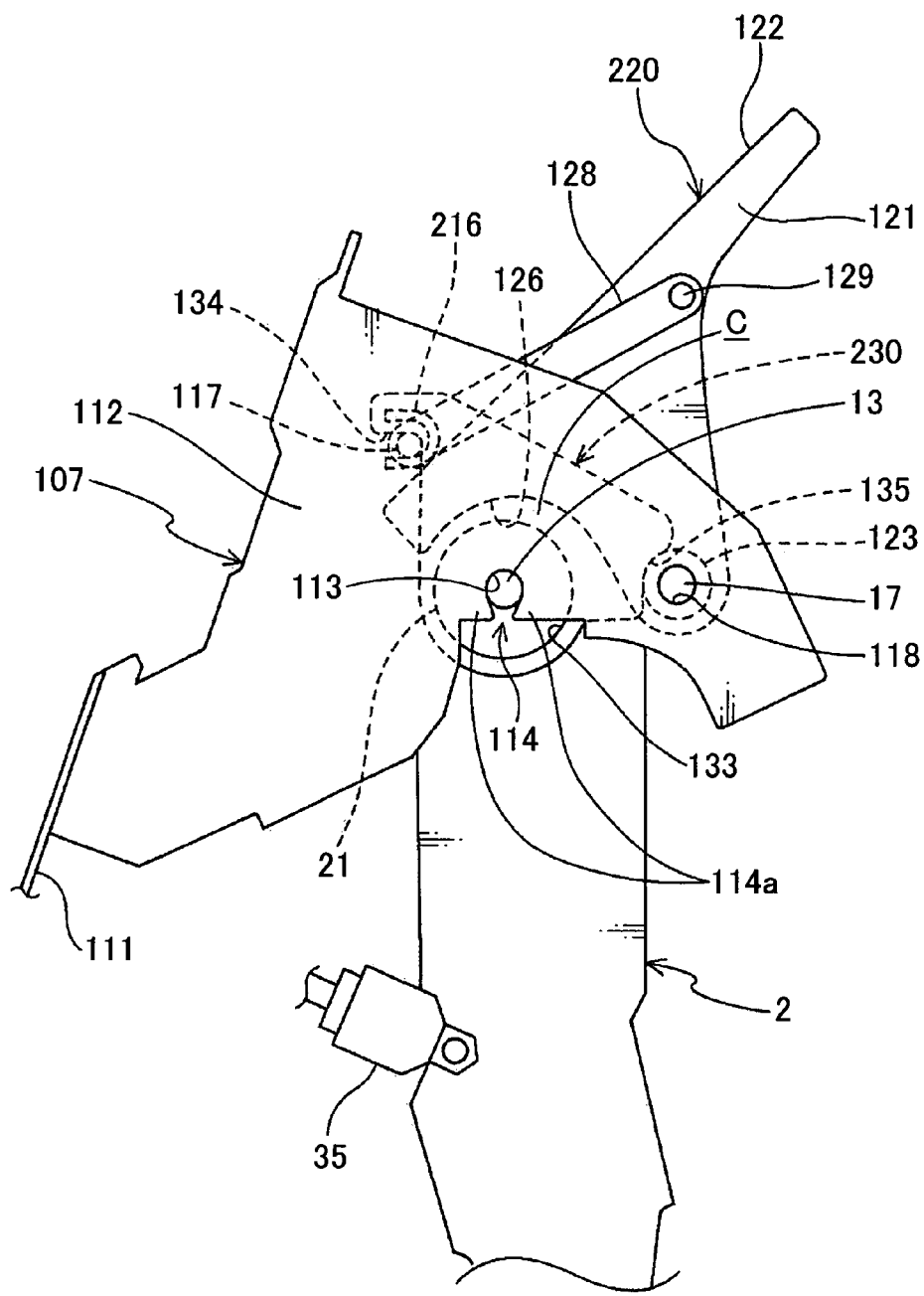
FIG. 27 is a side view of a support structure for an operating pedal according to an eleventh embodiment of the invention showing, in particular, a state under normal conditions.
Figure 28:
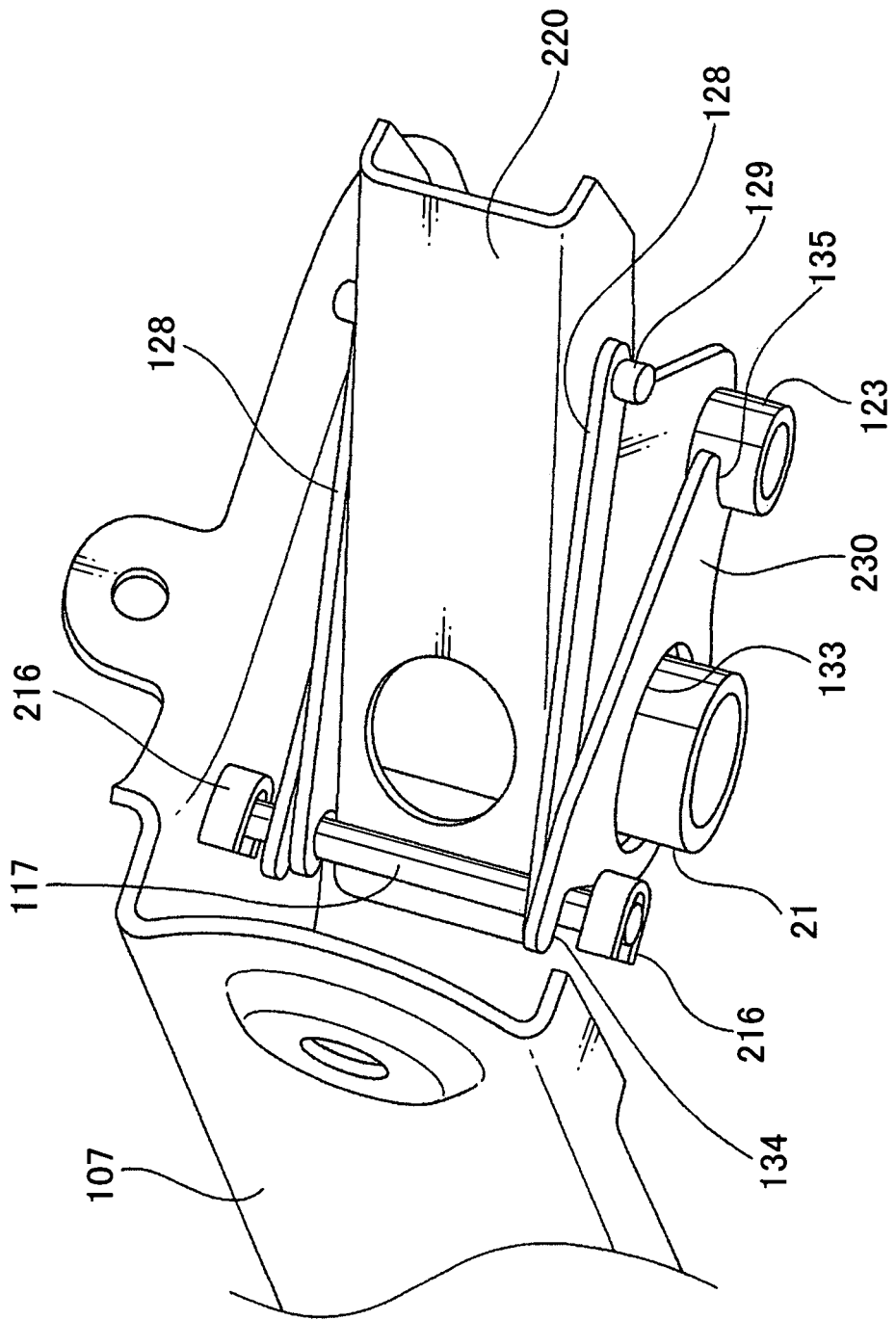
FIG. 28 is a perspective view of a principal portion of the operating pedal support structure of the eleventh embodiment showing, in particular, how elements shown in FIG. 27 are assembled.
Figure 29:
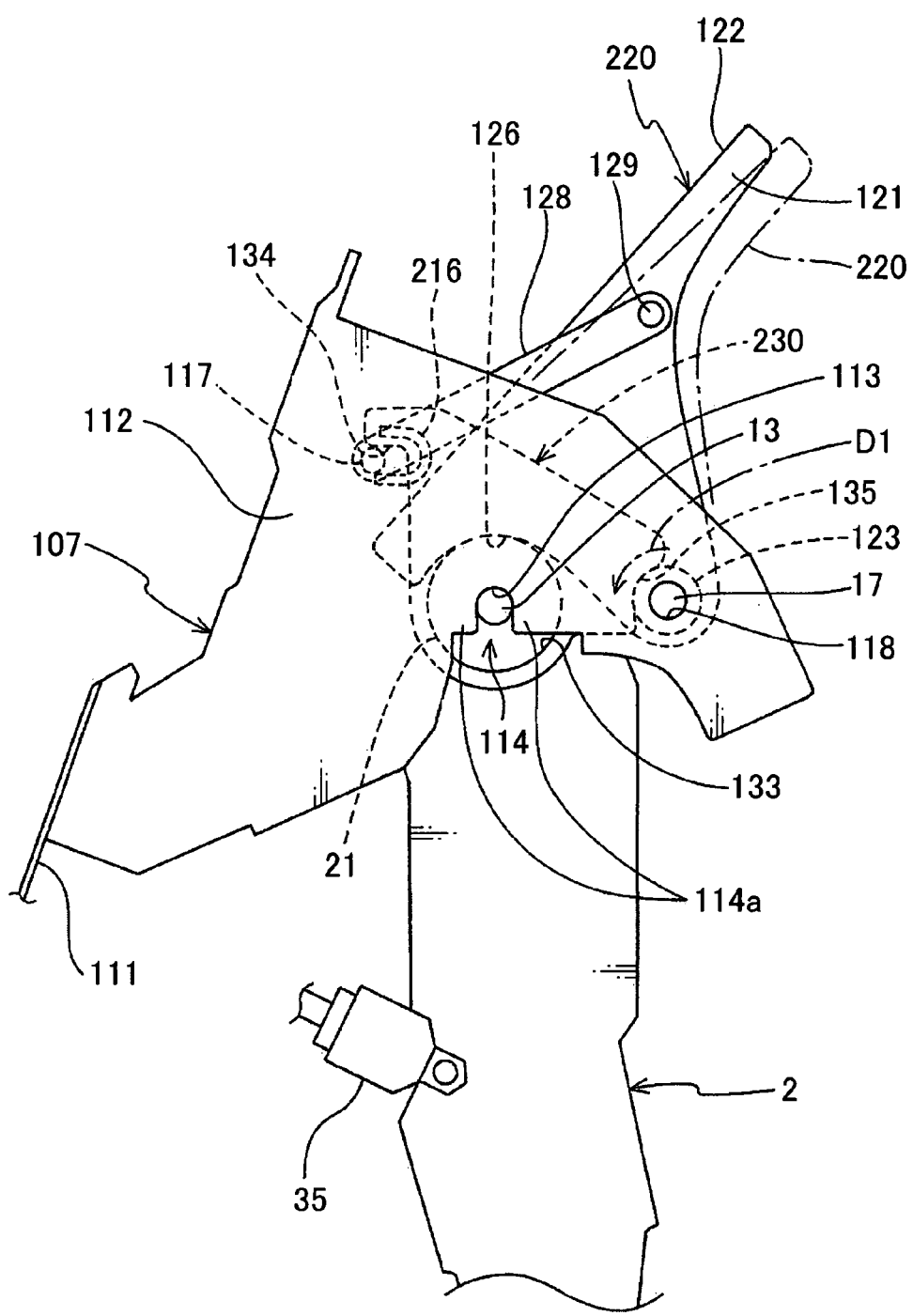
FIG. 29 is a side view of the principal portion of the operating pedal support structure corresponding to FIG. 27 showing, in particular, a state in an early stage of a vehicle collision.
Figure 30:
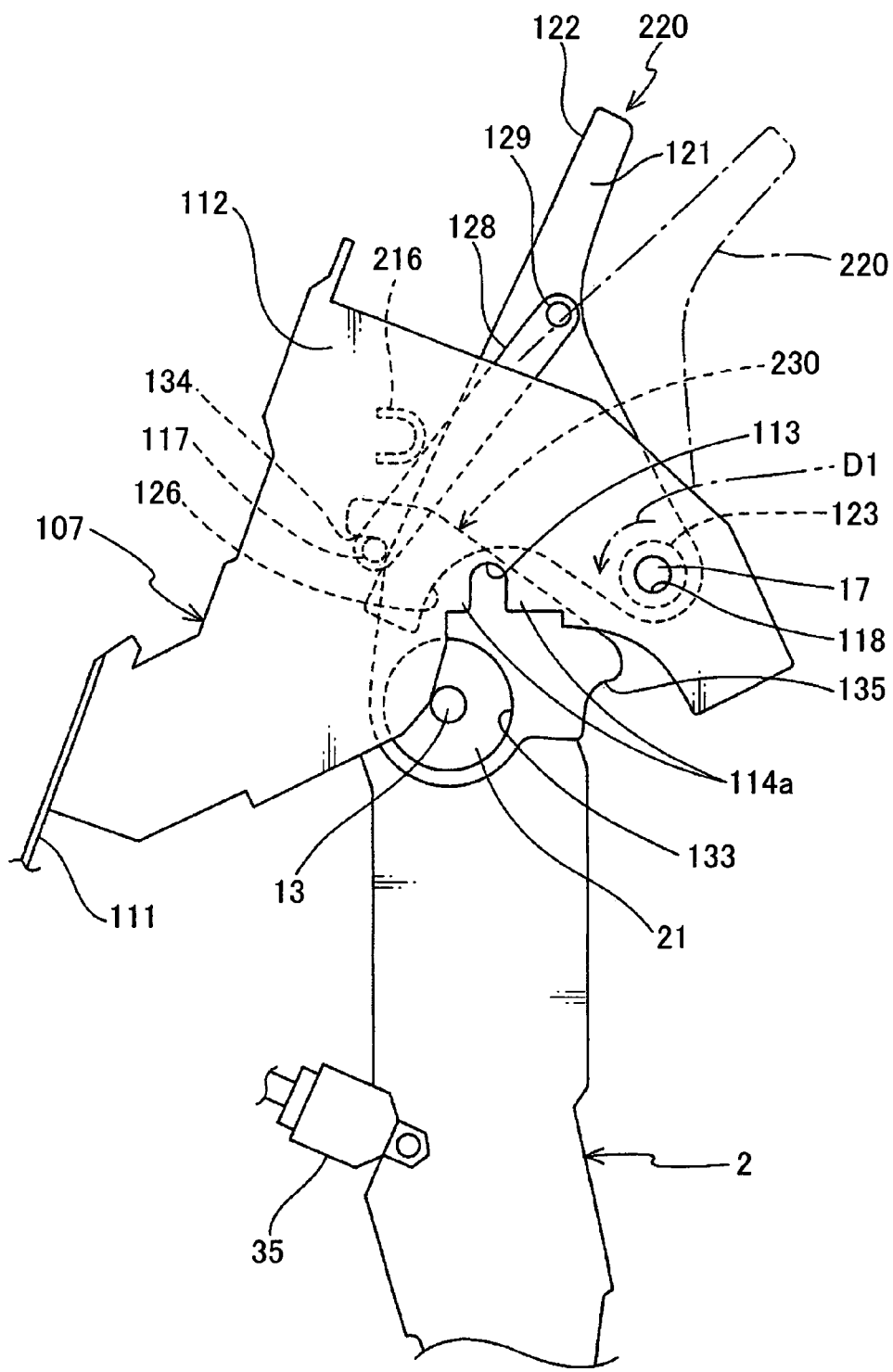
FIG. 30 is a side view of the principal portion of the operating pedal support structure corresponding to FIG. 27 showing, in particular, a state in which a pedal unit has come off as a result of the vehicle collision.

FIGS. 27 to 30 show an operating pedal support structure according to the eleventh embodiment of the invention. FIG. 27 is a side view of the operating pedal support structure of the eleventh embodiment showing, in particular, a state under normal conditions, FIG. 28 is a perspective view of a principal portion of the operating pedal support structure of the eleventh embodiment showing how elements shown in FIG. 27 are assembled, and FIGS. 29 and 30 are side views of the principal portion of the operating pedal support structure corresponding to FIG. 27 showing, in particular, a state during a vehicle collision.

As in the tenth embodiment discussed above, the operating pedal support structure of this embodiment includes left and right link bars 128 (each of which corresponds to a link member mentioned in the appended claims) which are connected to pin members 129 provided on outside surfaces of left and right side plate portions 121 of a pivotable lever 220, respectively, so that the link bars 128 can pivot on the respective pin members 129. The shaft 117 joined to free ends of the left and right link bars 128 is kept in position by retaining members 216 which are attached to inside surfaces of the side plate portions 112 of the bracket frame 107 to hold both ends of the shaft 117 under normal conditions. Each of the retaining members 216 is a generally U-shaped member whose open end is directed frontward as seen in side view. As can be clearly seen from FIG. 28, the left and right retaining members 216 hold the shaft 117 by the opposite end portions thereof (which extend sideways outward beyond both sides a shaft retainer 230).

Under normal conditions shown in FIG. 27, the pedal unit 2 is suspended by the bracket frame 107 with the first pivot shaft 13 fitted through the boss portions 21 of the pedal unit 2 and the supporting holes 113 formed in the bracket frame 107, and each of concave arc-shaped edges 126 of the pivotable lever 220 is located immediately above one of the boss portions 21 of the pedal unit 2 with a specific clearance C formed between the cylindrical outer surface of each boss portion 21 and the facing arc-shaped edge 126. Also, as first and second hooking parts 134, 135 of the shaft retainer 230 engage with the shaft 117 held by the aforementioned retaining members 216 and ringlike flanges 123 provided on the pivotable lever 220, respectively, the shaft retainer 230 is held in position as shown in FIG. 27. Even if a downward load is applied to the pedal unit 2 in the above-described condition, causing the first pivot shaft 13 to almost come off the supporting holes 113 in the bracket frame 107, the shaft retainer 230 remaining in its original position keeps the boss portions 21 of the pedal unit 2 in position. This structure of the embodiment serves to reliably prevent the pedal unit 2 from coming off downward from the bracket frame 107 under normal conditions.

In the event of a vehicle collision, on the other hand, the bracket frame 107 is displaced rearward together with the dash panel 1 (refer to FIG. 15) and a rear end of the pivotable lever 220 eventually goes into contact with the side member 33. Consequently, the pivotable lever 220 pivots on the second pivot shaft 17 in the counterclockwise direction as shown by an arrow D1 in FIGS. 29 and 30 in which an alternate long and short dashed line shows how a rear portion of the pivotable lever 220 is positioned before this pivoting motion. As a result of the pivoting motion of the pivotable lever 220, the shaft 117 held by the left and right retaining members 216 is forced frontward via the link bars 128 fitted to the pivotable lever 220 pivotably on the respective pin members 129, thereby causing the shaft 117 to slide frontward (leftward as illustrated) toward the open ends of the retaining members 216.

When displaced just beyond a specified amount, the shaft 117 goes out of the retaining members 216 through the open ends thereof and the shaft 117 is disengaged from the first hooking parts 134 of the shaft retainer 230 as depicted in FIG. 29. As a consequence, the aforementioned function of the shaft retainer 230 to prevent the pedal unit 2 from coming off downward from the bracket frame 107 is disabled. At this point, the pedal unit 2 remains suspended by the bracket frame 107 simply with the aid of the first pivot shaft 13 which is fitted in the supporting holes 113 formed in the left and right side plate portions 112 of the bracket frame 107.

When the pivotable lever 220 further pivots frontward from the position shown in FIG. 29, the arc-shaped edges 126 of the pivotable lever 220 exert a downward thrust on the respective boss portions 21 of the pedal unit 2 and the first pivot shaft 13 remaining in the boss portions 21, thereby widening the confinement channels 114 formed in the left and right side plate portions 112 of the bracket frame 107 due to plastic deformation of the front and rear projections 114a thereof and releasing the first pivot shaft 13 from the supporting holes 113 through the widened confinement channels 114. Consequently, the pedal unit 2 comes off the bracket frame 107 together with the shaft retainer 230 which has already been disengaged from the bracket frame 107 as shown in FIG. 30.

In this embodiment, the pivotable lever 220 is caused to pivot frontward in the event of a vehicle collision. The result is that the shaft 117 and the shaft retainer 230 are disengaged from each other, whereby the shaft retainer 230 is brought from a restrictive state to a nonrestrictive state in which the shaft retainer 230 no longer keeps the pedal unit 2 from coming off downward. As the pivotable lever 220 forces the boss portions 21 of the pedal unit 2 downward in this condition, the pedal unit 2 comes off the bracket frame 107 as illustrated in FIG. 30 in a reliable fashion in the event of a vehicle collision.

In particular, the pivotable lever 220 pushes the shaft 117 from behind via the pivotably mounted link bars 128 in a forward pivoting motion to release the shaft 117 from the shaft retainer 230 in an early stage of a collision in the operating pedal support structure of this embodiment. It is therefore possible to cause the shaft 117 to go out of the retaining members 216 and the shaft retainer 230 and the pedal unit 2 to come off the pedal bracket 103 as a result of pivoting of the pivotable lever 220 in a reliable fashion even when the angle of pivoting of the pivotable lever 220 is relatively small. In addition, the operating pedal support structure includes as means for retaining the shaft 117 in position under normal conditions the retaining members 216 attached to the inside surfaces of the left and right side plate portions 112 of the bracket frame 107, instead of the slots 116 formed in the side plate portions 112 of the bracket frame 107 in the above-described seventh to tenth embodiments, thus providing an adequate strength to the bracket frame 107.

Figure 31:
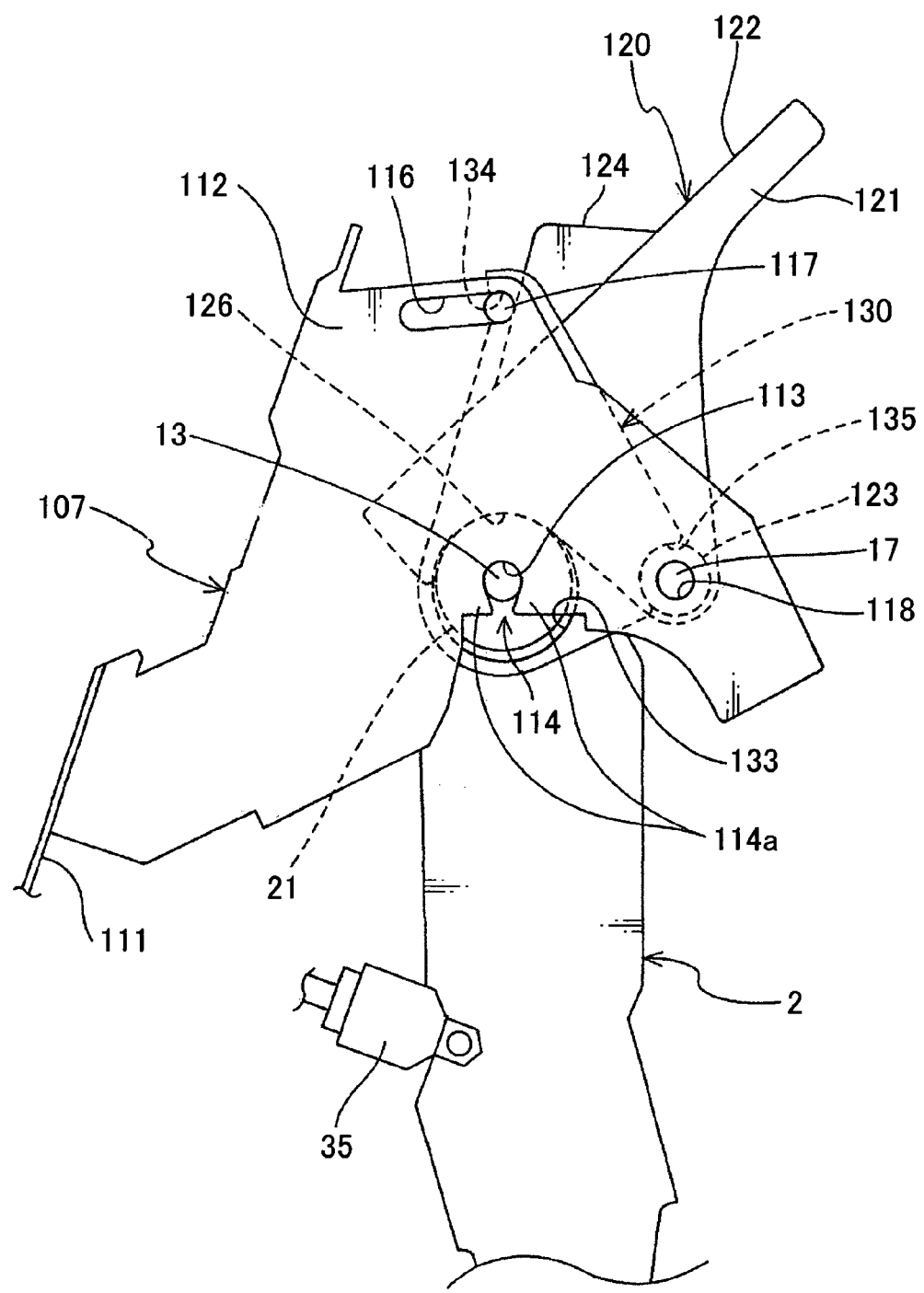
FIG. 31 is a side view showing an alternative arrangement which may be employed in the operating pedal support structures of the seventh to eleventh embodiments.

In the foregoing seventh to eleventh embodiments, the shaft retainer (130, 170, etc.) having the through holes 133 in which the boss portions 21 of the pedal unit 2 are fitted prevents the pedal unit 2 from coming off the pedal bracket 103 under normal conditions. In these embodiments, there is created a specific clearance C between the cylindrical outer surface of each boss portion 21 and the facing arc-shaped edge 126 of the pivotable lever (120, 160, etc.) while the boss portions 21 of the pedal unit 2 are fitted in the through holes 133 in the shaft retainer with no clearance therebetween. Thus, the pivotable lever pushes the boss portions 21 of the pedal unit 2 downward after a certain amount of time lag from a point in time when the shaft retainer is disengaged from the shaft 117 in the event of a collision. In this respect, the operating pedal support structures of the seventh to eleventh embodiments may be modified to employ an alternative arrangement depicted in FIG. 31. Specifically, the arrangement of FIG. 31 is such that there is formed a slight clearance between the cylindrical outer surface of each boss portion 21 and the facing arc-shaped edge 126 of the pivotable lever and the boss portions 21 of the pedal unit 2 are fitted in the through holes 133 in the shaft retainer with a specific clearance therebetween, so that the pivotable lever forces the boss portions 21 of the pedal unit 2 downward at about the same time as the aforementioned shaft retainer is disengaged.

Also, while the pedal bracket 103 suspends the pedal unit 2 with the boss portions 21 thereof fitted in the through holes 133 in the shaft retainer (130, 170, etc.) in the foregoing seventh to eleventh embodiments, the invention is not limited to this structure but may be so modified as to directly fit the first pivot shaft 13 in the through holes 133 in the shaft retainer, for example.

Also, while the second hooking parts 135 of the shaft retainer (130, 170, etc.) engage with the ring-like flanges 123 of the pivotable lever (120, 160 etc.) in the foregoing seventh to eleventh embodiments, the invention is not limited to this structure but may be so modified as to hook the second hooking parts 135 onto the second pivot shaft 17 or onto the pedal bracket 103.

While the operating pedal support structures each include the shaft retainer (51, 130, etc.) for preventing the pedal unit 2 from coming off downward under normal conditions in the foregoing first to eleventh embodiments and variations thereof, modification of the above-described supporting holes (14, 113) for fitting the first pivot shaft 13 and downward-opening confinement channels (40, 114) is also possible as discussed in twelfth and thirteenth embodiments of the invention below. Bracket frames of the twelfth and thirteenth embodiments are designated by the same numeral 7 as in the first to sixth embodiments, because the bracket frames of the former embodiments have generally the same shape as the bracket frames 7 of the latter embodiments.

Twelfth Embodiment

Figure 32:
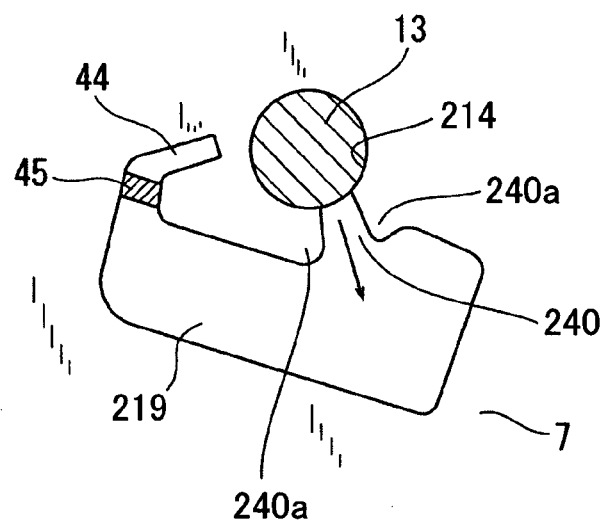
FIG. 32 is a side view showing a supporting hole of a first pivot shaft and a surrounding portion thereof according to a twelfth embodiment of the invention.

FIG. 32 is a side view showing a principal portion of an operating pedal support structure according to the twelfth embodiment of the invention, in which elements like those of the foregoing embodiments are designated by the same symbols and a detailed description of such elements are not given below again.

In left and right bracket arms of the bracket frame 7 of this embodiment, there are formed supporting holes 214 in which the first pivot shaft 13 is fitted under normal conditions and openings 219 into which the first pivot shaft 13 released in the event of a vehicle collision as in the earlier discussed first to sixth embodiments. The operating pedal support structure of this embodiment is characterized in that a confinement channel 240 (which corresponds to the confinement channel 40 of the first to sixth embodiments) formed in each bracket arm connecting the supporting hole 214 to the opening 219 extends obliquely downward to the rear from a lower part of the supporting hole 214. Additionally, there is formed a cutout 44 extending slightly upward and then obliquely rearward from an upper forward end of the opening 219 in each bracket arm. On the other hand, the pivotable lever 5 has a pair of reinforcing tabs 45 projecting sideways from the left and right side plate portions 27 (refer to FIG. 2). Each of these reinforcing tabs 45 is fitted in the cutout 44 near the opening 219 as illustrated under normal conditions.

A pair of front and rear projections 240a (which corresponds to the projections 40a of the first to sixth embodiments) is formed in each bracket arm of the bracket frame 7, the front and rear projections 240a facing each other with the confinement channel 240 located in between. While the facing projections 240a on each side are caused to deform by the first pivot shaft 13 when a large downward thrust is exerted on the first pivot shaft 13, the reinforcing tab 45 fitted in the cutout 44 serves to reduce deformation of the front projection 240a. Therefore, the confinement channels 240 in the left and right bracket arms would not be easily spread out and, thus, the supporting holes 14 securely hold the first pivot shaft 13 in position under normal conditions. The reinforcing tabs 45 fitted in the cutout 44 on each side serve to reinforce the front projections 240a and retain the first pivot shaft 13 in the supporting holes 14 as discussed above.

When the pivotable lever 5 pivots frontward in the event of a vehicle collision, on the other hand, the reinforcing tabs 45 come out of the cutouts 44 in the left and right bracket arms of the bracket frame 7 and, then, the pivotable lever 5 forces the boss portions 21 of the first pivot shaft 13 downward. In the event of a vehicle collision, reinforcement by the reinforcing tabs 45 of the pivotable lever 5 is disabled in this way and the downward thrust is exerted on the first pivot shaft 13, thus spreading out the confinement channels 240 in the left and right bracket arms easily and allowing the first pivot shaft 13 to come off the supporting holes 214 downward. Subsequently, the first pivot shaft 13 shifts obliquely downward to the rear along the spread confinement channels 240 and, as a consequence, the tread plate 34 of the pedal unit 2 (refer to FIG. 1) moves frontward, thereby protecting the driver's lower limb from a large external load in a reliable fashion.

Thirteenth Embodiment

Figure 33:
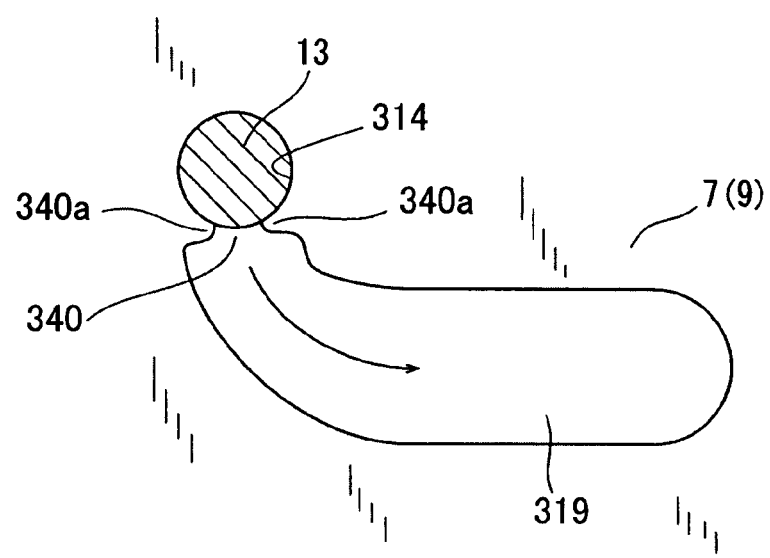
FIG. 33 is a side view showing a supporting hole of a first pivot shaft and a surrounding portion thereof according to a thirteenth embodiment of the invention.

FIG. 33 is a side view showing a principal portion of an operating pedal support structure according to the thirteenth embodiment of the invention, in which elements like those of the foregoing embodiments are designated by the same symbols and a detailed description of such elements are not given below again.

In left and right bracket arms of the bracket frame 7 of this embodiment, there are formed supporting holes 314 in which the first pivot shaft 13 is fitted under normal conditions and slitlike guide openings 319 (which correspond to a guide portion mentioned in the appended claims) extending along the longitudinal direction of the vehicle body obliquely downward to the rear from lower parts of the respective supporting holes 314. A rear portion of each guide opening 319 runs along the longitudinal direction of the vehicle body generally in a straight line, whereas a forward portion of each guide opening 319 slopes gradually upward frontward, curving in an arcuate form in side view. The supporting hole 314 formed above a forward end of the guide opening 319 in each bracket arm of the bracket frame 7 is contiguous to the guide opening 319 through a narrower confinement channel 340 formed in between. A pair of front and rear projections 340a is formed in each bracket arm, the front and rear projections 340a facing each other with the confinement channel 340 located in between. This pair of front and rear projections 340a formed on an edge of the supporting hole 314 on each side supports the first pivot shaft 13 from below.

In this embodiment, the supporting hole 314 and the guide opening 319 on each side are located generally in the same vertical plane extending in the longitudinal direction of the vehicle body, and the first pivot shaft 13 remains in the guide openings 319 even after released from the supporting holes 314. According to this structure, the first pivot shaft 13 which comes off the supporting holes 314 is guided rearward along the guide openings 319 so that the tread plate 34 of the pedal unit 2 (refer to FIG. 1) can be moved frontward in a reliable fashion in the event of a vehicle collision, making it possible to effectively protect the driver's lower limb. In the operating pedal support structure of the embodiment, the guide openings 319 each have a width substantially larger than the diameter of the first pivot shaft 13 so that the first pivot shaft 13 can freely move along the longitudinal direction of the vehicle body in the guide openings 319, especially along the straight rear portions thereof.

While the invention has thus far been described specifically with reference to the preferred embodiments thereof, by way of example, it is needless to say that the invention is not limited to these embodiments but may be improved or modified in design in various ways within the spirit and scope of the invention.

For example, each of the supporting holes (14, 113, etc.) in which the first pivot shaft 13 is fitted may be a closed circular hole whose lower peripheral part forms a vertically narrow strip which would easily break when forced by the first pivot shaft 13 in the event of a vehicle collision, thus allowing the first pivot shaft 13 to come off downward.

Also, while the first pivot shaft 13 and the second pivot shaft 17 are each supported at two points in the left and right bracket arms of the bracket frame 7 in the foregoing embodiments, the operating pedal support structures may be modified such that the first and second pivot shafts 13, 17 are supported at one point, or three or more points each.

Additionally, while the foregoing embodiments show specific examples in which the pedal unit 2 is a brake pedal for actuating the brake booster 4, the invention is not limited thereto but is also applicable to a clutch pedal, an accelerator pedal and a parking brake pedal, for instance, whichever operated by the foot.

In summary, a support structure of the present invention for an operating pedal supported by a dash panel and operated to pivot back and forth along a longitudinal direction of a vehicle body includes a pedal bracket affixed to the dash panel, a pedal unit pivotably suspended by the pedal bracket via a first pivot shaft extending along a lateral direction of the vehicle body, a pivotable lever pivotably supported by the pedal bracket via a second pivot shaft extending along the lateral direction such that the pivotable lever goes into contact with a side member and pivots on the second pivot shaft in a specific direction in the event of a vehicle collision, thereby thrusting and displacing the first pivot shaft downward and thus releasing the pedal unit from the pedal bracket, and a shaft retainer which is in a restrictive state in which the shaft retainer keeps the first pivot shaft from coming off downward under normal conditions, and goes into a nonrestrictive state in which the shaft retainer allows a displacement of the first pivot shaft as a result of pivoting of the pivotable lever in the specific direction in the event of the vehicle collision.

In this operating pedal support structure of the invention, the first pivot shaft constituting a pivotal axis of the pedal unit is supported directly by the pedal bracket affixed to the dash panel. This is advantageous in that comfortable operability of the pedal unit is obtained under normal conditions. Also, the pivotable lever which goes into contact with the side member and pivots in the event of a vehicle collision thrusts and displaces the first pivot shaft constituting the pivotal axis downward. This structure makes it possible to forcibly release the first pivot shaft from the pedal bracket by using a pivoting motion of the pivotable lever and prevent a rearward displacement of a tread plate provided at a lower end of the pedal unit in a reliable fashion. Furthermore, since the shaft retainer keeps the first pivot shaft from shifting downward under normal conditions, the operating pedal support structure can reliably prevent the pedal unit from coming off downward unexpectedly as a result of a depression of the tread plate by a driver.

Preferably, the shaft retainer is disposed below the first pivot shaft under normal conditions, and when the pivotable lever pivots in the specific direction in the event of the vehicle collision, the shaft retainer draws back from underneath the first pivot shaft and goes into the nonrestrictive state.

This structure can reliably prevent a downward displacement of the first pivot shaft and the pedal unit under normal conditions and permit the downward displacement thereof when the pivotable lever pivots in the event of a vehicle collision, so that the pedal unit comes off in a reliable fashion in the latter case.

Preferably, the shaft retainer is kept in the restrictive state under normal conditions and brought into the nonrestrictive state due to a downward thrust exerted by the pivotable lever pivoting in the specific direction in the event of the vehicle collision.

This structure allows the shaft retainer to reliably come off and go into the nonrestrictive state in the event of the vehicle collision due to the downward thrust exerted by the pivotable lever.

Preferably, the shaft retainer is supported pivotably about the pivotable lever, and when the pivotable lever pivots in the specific direction in the event of the vehicle collision, a hooking part of the shaft retainer engages with the pedal bracket so that the shaft retainer pivots in a direction opposite to the direction of pivoting of the pivotable lever and goes into the nonrestrictive state.

If the operating pedal support structure is such that the shaft retainer goes into the nonrestrictive state when the hooking part thereof engages with the pedal bracket as mentioned above, the shaft retainer can be reliably brought into the nonrestrictive state in which the shaft retainer no longer keeps the first pivot shaft from coming off downward in the event of the vehicle collision.

Preferably, the pedal bracket is provided with a stopper member for restricting pivoting motion of the shaft retainer so that the shaft retainer does not go into the nonrestrictive state when acted upon by the downward thrust from the first pivot shaft under normal conditions.

This structure produces an advantage that the pedal unit can be supported in a more stable fashion since the shaft retainer is reliably held in the restrictive state under normal conditions. Another advantage of this structure is that the stopper member serves to effectively avoid such a situation that the pivotable lever is supported in an unstable state due to a load exerted by the first pivot shaft upon the shaft retainer and transferred to the pivotable lever.

Preferably, the pedal bracket is fitted with a shaft member which extends along the lateral direction of the vehicle body and is held slidably in the pedal bracket, and the shaft retainer includes a retaining part disposed below the first pivot shaft under normal conditions, a first hooking part which engages with the shaft member held by the pedal bracket under normal conditions, and a second hooking part which engages with one of the second pivot shaft, the pivotable lever and the pedal bracket under normal conditions, wherein the shaft member is displaced in such a direction that the shaft member is disengaged from the shaft retainer when the pivotable lever pivots in the specific direction in the event of the vehicle collision, whereby the shaft retainer is brought into the nonrestrictive state.

In this structure, the shaft retainer is caused to engage with the shaft member held by the pedal bracket under normal conditions and disengage from the shaft member in the event of a vehicle collision. This structure is advantageous in that the shaft retainer serves to reliably prevent the first pivot shaft and the pedal unit from coming off downward under normal conditions and protect the driver's lower limb by allowing the pedal unit to come off in the event of a vehicle collision.

Preferably, the shaft member is suspended by the pedal bracket via a support member which is pivotably attached to the pedal bracket, and the shaft member is disengaged from the shaft retainer when the pivotable lever pivoting in the specific direction in the event of the vehicle collision thrusts and displaces the shaft member via the support member.

This structure, in which the shaft member is thrust and displaced via the support member which is pivotably attached to the pedal bracket, can smoothly disengage the shaft member from the shaft retainer in the event of a vehicle collision.

Preferably, the operating pedal support structure further includes a link member which pivotably connects the shaft member to the pivotable lever, wherein the shaft member is disengaged from the shaft retainer when the pivotable lever pivoting in the specific direction in the event of the vehicle collision thrusts and displaces the shaft member via the link member.

This structure, in which the shaft member is thrust and displaced via such a link member, also produces an advantage that the shaft member can be smoothly disengaged from the shaft retainer in the event of a vehicle collision.

Preferably, the pedal bracket has a retaining part which supports the first pivot shaft from underneath and thereby prevents a downward displacement thereof under normal conditions, and allows the first pivot shaft to come off downward when thrust and displaced by the pivotable lever in the event of the vehicle collision.

This structure can support the first pivot shaft and the pedal unit in a stable fashion under normal conditions and protect the driver's lower limb by allowing the pedal unit to come off in the event of a vehicle collision.

Preferably, the pedal unit is pivotably suspended by the pedal bracket with the first pivot shaft fitted in a supporting hole formed in the pedal bracket, wherein there is formed an opening below the supporting hole in the pedal bracket, the opening and the supporting hole being contiguous to each other through a confinement channel having a width smaller than the diameter of the first pivot shaft, and the retaining part is formed by facing edge portions of the confinement channel, and wherein the retaining part prevents the first pivot shaft from shifting downward through the confinement channel under normal conditions, whereas the first pivot shaft thrust and displaced by the pivotable lever in the event of the vehicle collision is allowed to come off downward while spreading out the confinement channel by forcibly deforming retaining part.

This structure can support the first pivot shaft and the pedal unit in a stable fashion under normal conditions and protect the driver's lower limb by allowing the pedal unit to come off in the event of a vehicle collision with such a simple arrangement that the supporting hole and the narrow confinement channel are formed in the pedal bracket.

Still preferably, the first pivot shaft thrust and displaced downward by the pivotable lever in the event of the vehicle collision comes off the pedal bracket.

Since an upper end of the pedal unit is completely set fee when the pedal unit comes off the pedal bracket, it is possible to reliably prevent a rearward displacement of the tread plate of the pedal unit in the event of a vehicle collision.

Still preferably, the first pivot shaft thrust and displaced downward by the pivotable lever in the event of the vehicle collision is guided downward and rearward along a guide portion provided in the pedal bracket.

This structure makes it possible to displace the upper end of the pedal unit downward and then rearward and correspondingly shift the tread plate of the pedal unit frontward in the event of a vehicle collision, thereby protecting the driver's lower limb effectively.

This application is based on Japanese Patent Application Serial Nos. 2006-108772 and 2006-188195, filed in Japan Patent Office on Apr. 11, 2006 and Jul. 7, 2006, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A support structure for an operating pedal which is supported by a dash panel and operated to pivot back and forth along a longitudinal direction of a vehicle body, said operating pedal support structure comprising:
    a pedal bracket affixed to the dash panel;
    said pedal bracket includes a slot and a supporting hole having a confinement channel;
    a shaft member slidably mounted in said slot;
    a pedal unit pivotably suspended by said pedal bracket via a first pivot shaft extending along a lateral direction of the vehicle body; the pedal unit including a boss portion through which the first pivot shaft is fitted;
    a lever pivotably supported by said pedal bracket via a second pivot shaft extending along the lateral direction such that said lever goes into contact with a side member and pivots on said second pivot shaft in a specific direction in the event of a vehicle collision, thereby thrusting and displacing said first pivot shaft and said boss portion downward and thus releasing said pedal unit from said pedal bracket, said lever including a concave arc-shaped edge; and
    a shaft retainer which is in a restrictive state in which said shaft retainer keeps said first pivot shaft from coming off downward under normal conditions, and goes into a nonrestrictive state in which said shaft retainer allows a displacement of said first pivot shaft as a result of pivoting of said lever in the specific direction in the event of the vehicle collision;
    wherein said lever is adapted to initially rotate around said second pivot shaft in the event of a vehicle collision and cause said shaft retainer to disengage from said shaft member supported in said slot formed in said pedal bracket and to be in a nonrestrictive state before said boss portion becomes disengaged from said pedal bracket, and, upon further rotation of said lever around said second pivot shaft, said concave arc-shaped edge of said lever pushes said boss portion and said first pivot shaft downward, spreading the confinement channel of the supporting hole and thus releasing said first pivot shaft of said pedal unit from said supporting hole of said pedal bracket, which results in releasing said pedal unit from said pedal bracket.

2. The operating pedal support structure according to claim 1, wherein said shaft retainer is disposed below said first pivot shaft under normal conditions, and when said lever pivots in the specific direction in the event of the vehicle collision, said shaft retainer draws back from underneath said first pivot shaft and goes into the nonrestrictive state.

3. The operating pedal support structure according to claim 2, wherein said shaft retainer is held by said pedal bracket in the restrictive state under normal conditions and brought into the nonrestrictive state by coming off said pedal bracket due to a downward thrust exerted by said lever pivoting in the specific direction in the event of the vehicle collision.

4. The operating pedal support structure according to claim 2, wherein said shaft retainer is supported pivotably about said lever, and when said pivotable lever pivots in the specific direction in the event of the vehicle collision, a hooking part of said shaft retainer engages with said pedal bracket so that said shaft retainer pivots in a direction opposite to the direction of pivoting of said lever and goes into the nonrestrictive state.

5. The operating pedal support structure according to claim 2, wherein said pedal bracket is provided with a stopper member for restricting pivoting motion of said shaft retainer so that said shaft retainer does not go into the nonrestrictive state when acted upon by the downward thrust from said first pivot shaft under normal conditions.

6. The operating pedal support structure according to claim 1, wherein said pedal bracket is fitted with the shaft member which extends along the lateral direction of the vehicle body and is held slidably in said pedal bracket, and said shaft retainer includes:
    a retaining part disposed below said first pivot shaft under normal conditions;
    a first hooking part which engages with said shaft member held by said pedal bracket under normal conditions; and
    a second hooking part which engages with one of said second pivot shaft, said lever and said pedal bracket under normal conditions;
    wherein said shaft member is displaced in such a direction that said shaft member is disengaged from said shaft retainer when said lever pivots in the specific direction in the event of the vehicle collision, whereby said shaft retainer is brought into the nonrestrictive state.

7. The operating pedal support structure according to claim 6, wherein said shaft member is suspended by said pedal bracket via a support member which is pivotably attached to said pedal bracket, and said shaft member is disengaged from said shaft retainer when said lever pivoting in the specific direction in the event of the vehicle collision thrusts and displaces said shaft member via said support member.

8. The operating pedal support structure according to claim 6 further comprising a link member which pivotably connects said shaft member to said lever, wherein said shaft member is disengaged from said shaft retainer when said lever pivoting in the specific direction in the event of the vehicle collision thrusts and displaces said shaft member via said link member.

9. The operating pedal support structure according to claim 1, wherein said pedal bracket has a retaining part which supports said first pivot shaft from underneath and thereby prevents a downward displacement thereof under normal conditions, and allows said first pivot shaft to come off downward when thrust and displaced by said lever in the event of the vehicle collision.

10. The operating pedal support structure according to claim 9, wherein said pedal unit is pivotably suspended by said pedal bracket with said first pivot shaft fitted in the supporting hole formed in said pedal bracket;
    the confinement channel extending continuously downward from the supporting hole, the confinement channel having a width smaller than the diameter of said first pivot shaft, and the retaining part is formed by facing edge portions of the confinement channel; and
    wherein the retaining part prevents said first pivot shaft from shifting downward through the confinement channel under normal conditions, whereas said first pivot shaft thrust and displaced by said lever in the event of the vehicle collision is allowed to come off downward while spreading out the confinement channel by forcibly deforming said retaining part.

11. The operating pedal support structure according to claim 1, wherein said first pivot shaft thrust and displaced downward by said lever in the event of the vehicle collision comes off said pedal bracket.

12. The operating pedal support structure according to claim 1, wherein said first pivot shaft thrust and displaced downward by said lever in the event of the vehicle collision is guided downward and rearward along a guide portion provided in said pedal bracket.

13. A support structure for an operating pedal which is supported by a dash panel and operated to pivot back and forth along a longitudinal direction of a vehicle body, said operating pedal support structure comprising:
 a pedal bracket frame affixed to the dash panel;
 a pedal unit including a first pivot shaft, extending along a lateral direction of the vehicle body, mounted at its upper part of said first pivot shaft and a boss portion through which the first pivot shaft is fitted, said pedal unit pivotably suspended by said pedal bracket frame via the first pivot shaft
 a lever pivotably supported by said pedal bracket frame via a second pivot shaft extending along the lateral direction and a shaft member extending along the lateral direction such that in the event of a vehicle collision said lever goes into contact with a side member and pivots on said second pivot shaft in a specific direction by displacing said shaft member away, thereby thrusting and displacing said first pivot shaft and said boss portion downward and thus releasing said pedal unit from said pedal bracket; and
 a shaft retainer which is in a restrictive state in which said shaft retainer keeps said first pivot shaft from coming off downward under normal conditions, and goes into a nonrestrictive state in which said shaft retainer allows a displacement of said first pivot shaft as a result of pivoting of said lever in the specific direction in the event of the vehicle collision;
 wherein said lever maintains its position with respect to the pedal bracket frame by being held with said second pivot shaft and said shaft member,
 said lever is formed with an edge;
 said shaft maintains a clearance between the edge and the boss portion of the pedal unit when not in a state of collision, and
 said lever is pivotable around said second pivot shaft by displacing said shaft member in the event of a vehicle collision and to be in a nonrestrictive state before said boss portion is in contact with said edge of the lever,
 and upon further rotation of said lever around said second pivot shaft, said edge of said lever pushes said boss portion and said first pivot shaft downward, which results in releasing said pedal unit from said pedal bracket.

14. The support structure for an operating pedal as recited in claim 13, wherein the edge formed on the lever is in a form of a concave arc-shape.

15. The support structure for an operating pedal as recited in claim 13, wherein a shaft member is displaceable along a slot formed in the pedal bracket frame.

16. The support structure for an operating pedal as recited in claim 13, wherein the pedal bracket frame includes a supporting hole and a confinement channel.

17. The support structure for an operating pedal as recited in claim 13, wherein the shaft retainer is held at the pedal bracket frame by the second pivot shaft and the shaft member.

* * * * *